(12) United States Patent
Mori

(10) Patent No.: US 8,805,200 B2
(45) Date of Patent: Aug. 12, 2014

(54) OPTICAL TRANSMISSION SYSTEM

(75) Inventor: Shota Mori, Kawasaki (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 745 days.

(21) Appl. No.: 13/039,120

(22) Filed: Mar. 2, 2011

(65) Prior Publication Data

US 2011/0217040 A1 Sep. 8, 2011

(30) Foreign Application Priority Data

Mar. 5, 2010 (JP) ................................. 2010-048545

(51) Int. Cl.
*H04B 10/00* (2013.01)

(52) U.S. Cl.
USPC .............. 398/152; 398/65; 398/102; 398/161

(58) Field of Classification Search
USPC ............. 398/152, 53, 52, 43, 75, 76, 79, 102, 398/65, 161; 359/483, 484, 497
See application file for complete search history.

(56) References Cited

U.S. PATENT DOCUMENTS

2010/0080570 A1* 4/2010 Conroy et al. ................ 398/154

OTHER PUBLICATIONS

Miyamoto, et al., "Technical Trend of High-capacity Optical Transport Network Based on 100 Gbit/s Channels", Journal of IEICE (The Institute of Electronics, Information and Communication Engineers), p. 775-781, vol. 92, No. 9, 2009; and English Translation, 6 pages.

Kikuchi, "Fundamentals of Polarization Demultiplexing and Compensation for Polarization-mode Dispersion Using Digital Coherent Receivers", OCS2009-T01, IEICE, OCS (Optical Communication System) Class-2 1st Colloquium entitled "New Optical Transport Technology using Digital Signal Processing", p. 1-11, Jul. 30, 2009; and English Translation, 10 pages.

* cited by examiner

*Primary Examiner* — M. R. Sedighian
(74) *Attorney, Agent, or Firm* — Christie, Parker & Hale, LLP

(57) ABSTRACT

An optical transmission system includes a polarization multiplexing optical transmitter for transmitting an optical signal, where an X-polarized signal and a Y-polarized signal each having a having predetermined frame structure are polarization-multiplexed, to an optical fiber transmission path, and a polarization multiplexing receiver for receiving the optical signal that has propagated through the optical transmission path. The polarization multiplexing optical transmitter delays a frame assignment signal (FAS) in the Y-polarized signal, by a predetermined delay time $\tau$, relative to FAS in the X-polarized signal. The polarization multiplexing optical receiver includes a polarization splitter for splitting the received optical signal into two branches of polarized signals which are orthogonal to each other, a time difference detector for detecting a time difference of FASs between the two polarized signals, and a polarization identifying unit for identifying which of the two polarized signals is the X-polarized signal or Y-polarized signal.

8 Claims, 22 Drawing Sheets

OPTICAL TRANSMISSION SYSTEM

BACKGROUND OF THE INVENTION

1. Field of the Invention

The present invention relates to an optical transmission system and, more particularly, to an optical transmission system employing orthogonal polarization multiplexing in which mutually independent information is put onto orthogonally polarized waves, which are then polarization-multiplexed for transmission.

2. Description of the Related Art

Recent years have seen the commercialization of some optical transmission systems that can transmit large-volume signals of 1 Tb/s or more, per optical fiber core, over several hundred kilometers by wavelength-multiplexing a plurality of signal channels of 40 Gb/s per wavelength. Currently, earnest efforts are being made to develop technologies capable of realizing even wider bandwidths by raising the transmission rate per wavelength to 100 Gb/s.

To that end, electrical circuitry having wider bandwidth capacity must be introduced if higher transmission rates per wavelength are to be achieved. However, a problem with the current device technology is its inability to readily design electrical circuitry capable of realizing the transmission rate of 100 Gb/s.

Also, the optical signal-to-noise ratio (OSNR) required to achieve certain code error rates is inversely proportional to the bit rate. To realize 100 Gb/s, therefore, the optical signal-to-noise ratio must attain an improvement of about 10 dB over the transmission rate of 10 Gb/s. Yet, the resulting problem is the limited interval of optical amplifiers and the limited number of relay devices, which in turn will shorten the transmission distance.

Further, if the modulation bandwidth rises to 100 Gb/s, the spectrum width of the optical signal will be widened. Therefore, the wavelength interval needs to be widened if the crosstalk with neighboring wavelengths is to be avoided. And the consequence is the problem of lowered frequency usage efficiency.

As a way of overcoming this problem, orthogonal polarization multiplexing and digital coherent receiving have been the focuses of attention in recent years.

Orthogonal polarization multiplexing is a technique of multiplexing signal channels using polarized waves, which are one of the properties of light as electromagnetic waves. Light, which is transverse waves, has two polarization components orthogonal to its direction of travel. In orthogonal polarization multiplexing, mutually independent information is put onto these two polarized waves, and they are multiplexed by a polarization beam combiner for transmission. In this multiplexing method, two signals of 50 Gb/s, for instance, can be polarization-multiplexed for a transmission rate of 100 Gb/s per wavelength. Thus, it is possible to decrease the frequency bandwidth of electrical circuitry by half while maintaining the transmission rate per wavelength.

Next, digital coherent receiving is a method of using digital signal processing to the best advantage in coherent optical communications. The coherent optical communications are a technology which was subjected to active research and development (R&D) in the 1980s. In this technology, an optical signal transmitted over a long distance is made to interfere with an optical signal from a local oscillator (LO) installed at a receiving station, and the resulting beat signal is used in the receiving. It was expected then that high receiving sensitivity could be achieved by raising the power of the LO and long-haul and high-speed transmissions would be realized thereby. However, the practical application of this technology did not materialize because of the necessity to achieve exact agreement in transmission frequency and signal phase between the laser of a transmitting station installed in a remote location and an LO and also the failure to realize a high-precision laser to be used therein. In the meantime, the performance of the conventional intensity modulation-direct detection (IM-DD) method has undergone dramatic improvements due to the arrival of the erbium-doped fiber amplifier (EDFA) and wavelength division multiplexing (WDM). Consequently, the R&D of the coherent receiving has had to follow the path of decline.

However, the improvement of performance characteristics by EDFA and WDM is now approaching its limit now that the transmission rate per wavelength has risen as high as 100 Gb/s. Also, stabler interference can now be achieved by real-time compensation by digital signal processing for the above-mentioned errors resulting from disagreement in frequency and phase of laser beams. Under such circumstances, the coherent receiving method is again coming under the spotlight today. Another major factor in this development is the advance of CMOS device technology which is making the so-far unfeasible ultrahigh-speed electronic circuitry feasible. By making the most of the digital signal processing technology, the digital coherent receiving method can achieve, within the electrical domain, the splitting of polarization-multiplexed signals and compensation for wavelength dispersion or polarization mode dispersion. Therefore, this technology may present possibilities of significant improvements in optical transmission characteristics. For the orthogonal polarization multiplexing method and the digital coherent receiving method, see Reference (1) in the following Related Art List.

FIG. 1 is a block diagram showing an exemplary structure of a digital coherent optical transmission system. A digital coherent optical transmission system 110 shown in FIG. 1 includes a polarization multiplexing optical transmitter 120 and a polarization multiplexing optical receiver 130.

In the polarization multiplexing optical transmitter 120, continuous-wave (CW) light outputted from a continuous-wave (CW) laser 121 is split into two branches by a 3 dB coupler 122, and the two branches of light are inputted to a first Mach-Zehnder modulator 123 and a second Mach-Zehnder modulator 124, respectively. At the first Mach-Zehnder modulator 123, one of the CW light beams is externally modulated in accordance with a first client signal, whereas at the second Mach-Zehnder modulator 124, the other of the CW light beams is externally modulated in accordance with a second client signal. The optical signal outputted from the first Mach-Zehnder modulator 123 is inputted to the X-axis side of a polarization beam coupler (PBC) 125. The optical signal outputted from the second Mach-Zehnder modulator 124 is inputted to the Y-axis side of the polarization beam coupler 125 after passing through a ½ wavelength plate 126. Hereinafter, the optical signal inputted to the X-axis side of the polarization beam coupler 125 will be referred to as an X-polarized signal, and the optical signal inputted to the Y-axis side thereof as a Y-polarized signal. The X-polarized signal and the Y-polarized signal are then polarization-multiplexed by the polarization beam coupler 125 and outputted to an optical fiber transmission path 140 as a polarization-multiplexed optical signal.

In the optical fiber transmission path 140, the polarization state of the signal as it is outputted from the polarization multiplexing optical transmitter 120 is not preserved, but the polarization-multiplexed optical signal changes into various polarization states such as linearly-polarized light, right-handed or left-handed circularly-polarized light, and elliptically-polarized light as it propagates therethrough. The polarization state, which is not constant temporally either, keeps changing under the influence of various disturbances to the optical fiber transmission path 140.

In the polarization multiplexing optical receiver 130, the polarization-multiplexed optical signal from the optical fiber transmission path 140, having the two polarized waves mixed, is inputted to a polarization beam splitter (PBS) 131, where it is split into two polarized waves. Also, outputted from the local oscillator (LO) 132 is a local light having nearly identical wavelength to that of the signal light. This local light is separated into two polarization components by a polarization beam splitter 133. The four polarization components split by the polarization beam splitters 131 and 133 are inputted to optical circuits called optical 90-degree hybrid circuits 134 and 135, where the signal light and the local light are made to interfere with each other.

FIG. 2 illustrates an exemplary structure of optical 90-degree hybrid circuits 134 and 135. A received signal light is inputted to one of the input ports of the optical 90-degree hybrid circuit, and a local light is inputted to the other of the input ports thereof. The signal light is split into two beams by a coupler 210, and the local light is split into two beams by a coupler 212. One of the split signal light is coupled to the local light by a coupler 211 and then outputted to a balanced photodiode (PD) disposed posteriorly. The other of the split signal light is coupled by a coupler 214 to the local light, whose phase has been shifted by 90 degrees as it passed through a 90-degree phase shift circuit 213, and then outputted to a balanced photodiode (PD) disposed posteriorly.

Referring back to FIG. 1, the digital coherent optical transmission system 110 will further be explained. The optical signal received by the polarization multiplexing optical receiver 130 is split into two branches by the polarization beam splitter 131, and is further split into two branches by the optical 90-degree hybrid circuits 134 and 135, respectively. That is, the optical signal is split into a total of four optical signals by the optical circuit up to the optical 90-degree hybrid circuits 134 and 135. These four optical signals are subjected to optical-to-electrical (O/E) conversion by four balanced photodiodes 136.

The four electric signals outputted from the balanced photodiodes 136 are amplified by electric amplifiers 137 and then digitized by an ultrahigh-speed analog-to-digital converter (ADC) 138. The digitized signals are inputted to a digital signal processor (DSP) 139 where they are subjected to compensation for frequency/phase shift, between the received signal light and the local light, and polarization splitting. Further, waveform shaping, such as wavelength dispersion compensation and polarization mode dispersion compensation, is performed at the DSP 139. Then, through a clock extraction, the first client signal and the second client signal, which have been loaded on the X-polarized signal and the Y-polarized signal, respectively, by the polarization multiplexing optical transmitter 120, are reproduced (refer to Reference (2), in the following Related Art List, for methods of polarization multiplexing/demultiplexing and dispersion compensation by digital signal processing).

Note that the method of receiving two polarized waves in a mixed state and splitting them subsequently by a digital signal processing is called polarization diversity. Diversity, which signifies variety, is a technique widely employed to improve communication quality in the field of wireless communications. The polarization diversity in wireless communications is a technique of using a bidirectional antenna (dual-polarized diversity antenna) by which both of the polarized waves are received and coupled for output or one of them with stronger output is used.

Thus, the technology of combining the above-described orthogonal polarization multiplexing transmission and digital coherent receiving is today a focus of attention as a very effective technology that can double the bit rate per wavelength while maintaining the operation speed of electrical circuitry.

RELATED ART LIST (1) Yutaka MIYAMOTO, Eiji YOSHIDA and Masahito TOMIZAWA, "Technical Trend of High-capacity Optical Transport Network Based on 100 Gbit/s Channels", Journal of IEICE (The Institute of Electronics, Information and Communication Engineers), p. 775-781, Vol. 92, No. 9, 2009
(2) Kazuro KIKUCHI, "Fundamentals of Polarization Demultiplexing and Compensation for Polarization-mode Dispersion Using Digital Coherent Receivers", OCS2009-T01, IEICE, OCS (Optical Communication System) Class-2 1st Colloquium entitled "New Optical Transport Technology using Digital Signal Processing", Jul. 30, 2009

A combination of orthogonal polarization multiplexing and digital coherent receiving as described above provides a great advantage of doubling the capacity of transmission. However, it can create a new problem that has not been experienced before. That is, the two signals having been polarization-split by the digital coherent receiving method cannot be determined, by the optical characteristics alone, as to which of the X-polarized signal and the Y-polarized signal they were at the transmitter. This is because the two polarized waves are physically equivalent to each other and have exactly the same characteristics. Let us denote the output signals after polarization splitting at the polarization multiplexing optical receiver 130 by polarized signal A and polarized signal B. Then there will be the following two cases on account of the inability to identify the polarized waves:

(1) X-polarized signal→Polarized signal A, Y-polarized signal→Polarized signal B
(2) X-polarized signal→Polarized signal B, Y-polarized signal→Polarized signal A When (1) is the case under normal circumstances, the case (2) is an event in which the two client signals have places switched with each other. For example, suppose that data bound for Osaka from Tokyo is loaded on X, and data bound for Nagoya from Tokyo on Y. Then, in the case of (2), the data bound for Osaka will go to Nagoya, and the data bound for Nagoya will go to Osaka, thus resulting in transmissions in unexpected directions.

This problem is attributable to the two polarized waves being physically equivalent to each other and can occur whatever receiving method is employed.

This event will be explained in a little more detailed manner below. A method using a Poincare sphere is a way of representing the polarization state of light.

FIG. 3 is an illustration for explaining a Poincare sphere. Any given polarization state is represented by a point on the surface of the Poincare sphere. On the Poincare sphere having three axes S1, S2, and S3 set therewithin, the values representing the spherical coordinates are called the Stokes parameters. For example, the point (0,0,1), which corresponds to the north pole of the sphere, represents a right-handed circularly-polarized wave, the point (0,0,−1), which corresponds to the south pole, represents a left-handed circularly-polarized wave, and the point (x,y,0), which is on the equator, represents a linearly-polarized wave. In particular, the point (1,0,0) represents a horizontal linearly-polarized wave, and the point (−1,0,0) a vertical linearly-polarized wave. All the other points on the Poincare sphere represent elliptically-polarized waves.

Also, an event that takes place when light passes through a polarizing element, such as an anisotropic crystal, can be taken as a rotation of the Poincare sphere. For example, a ½ wavelength plate, which converts a horizontally-polarized wave into a vertically-polarized wave, corresponds to a 180-degree rotation of the Poincare sphere. Also, a ¼ wavelength plate converting a linearly-polarized light into a circularly-polarized light corresponds to a 90-degree rotation, thereby shifting a point on the equator to the north pole or the south pole.

In a polarization-multiplexed transmission, the X-polarized wave and the Y-polarized wave are coupled by the polarization beam coupler, and this state is represented by a state of two signals existing at the north pole and the south pole on the Poincare sphere. When the light beam propagates through the optical fiber transmission path, differences in the refractive index in the vertical and horizontal directions of optical fiber can occur under the influences of deformations and bends therein. Such differences in the refractive index cause rotations of the Poincare sphere in the same way as when the light passes through the polarizing element. Since these variations work equally on both the polarized waves, the points representing the two signals shift to arbitrary positions on the sphere while maintaining the diagonally opposite positions.

As mentioned earlier, in the polarization-multiplexed digital coherent receiving method, the two polarized waves X and Y in a mixed state are made to interfere with the local light by the use of optical 90-degree hybrid circuits, and the processing of polarization splitting is done by a DSP. Used in the DSP is a digital filter called a finite impulse response (FIR) filter. The FIR filter introduces a time delay into the two received signals and multiplies them by a coefficient before it derives the output of polarization-demultiplexed signals through further processes of cross-multiplication and addition. The splitting into the two polarized waves is thus performed by automatically and appropriately setting the coefficient according to the input signals.

FIG. 4 is an illustration for explaining an example of polarization splitting in the digital coherent receiving method. Two polarization components, which were a horizontal linearly-polarized wave (1,0,0) and a vertical linearly-polarized wave (−1,0,0) at the exit from the polarization multiplexing optical transmitter, are shifted to arbitrary positions as they propagate through a transmission path. The processing of polarization splitting at the polarization multiplexing optical receiver is equivalent to the shifting of the two polarization components to the two points of (1,0,0) and (−1,0,0) from the above-mentioned state.

In FIG. 4, a received elliptically-polarized wave 1 is converging on the horizontal linearly-polarized wave (1,0,0), and a elliptically-polarized wave 2 is converging on the vertical linearly-polarized wave (−1,0,0). Note here that which of the points (1,0,0) and (−1,0,0) the elliptically-polarized waves 1 and 2 each converges to depends on the initial values indicating where on the Poincare sphere they were located when the DSP started the polarization control on the inputted signals. These initial values are determined by polarization transformations that the signals have undergone in the optical fiber transmission path before they reach the receiver. They do not depend on which of the X-polarized wave and the Y-polarized wave they each were at the polarization multiplexing optical transmitter. Therefore, it is also conceivable that the elliptically-polarized wave 1 converges to (−1,0,0), and the elliptically-polarized wave 2 converges to (1,0,0).

As described above, therefore, there remains a problem of inability to distinguish two polarized waves from each other at polarization splitting even when the digital coherent receiving method, which is a very useful technology, is used.

SUMMARY OF THE INVENTION

The present invention has been made in view of the foregoing circumstances, and a purpose thereof is to provide an optical transmission system that can distinguish the polarization-split signals correctly.

In order to resolve the aforementioned problems, an optical transmission system according to one embodiment of the present invention comprises: an optical transmitter configured to transmit an optical signal, where an X-polarized signal and a Y-polarized signal each having a having predetermined frame structure are polarization-multiplexed, to an optical transmission path; and an optical receiver configured to receive the optical signal that has propagated through the optical transmission path. The optical transmitter includes a delay generator configured to delay a frame start position of the Y-polarized signal, by a predetermined delay time, relative to that of the X-polarized signal. The optical receiver includes: a polarization splitter configured to split the received optical signal into two polarization signals which are orthogonal to each other; a time difference detector configured to detect a time difference of frame start positions between the two polarized signals; and a polarization identifying unit configured to identify which of the two polarized signals is the X-polarized signal or Y-polarized signal.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

Figure 1:
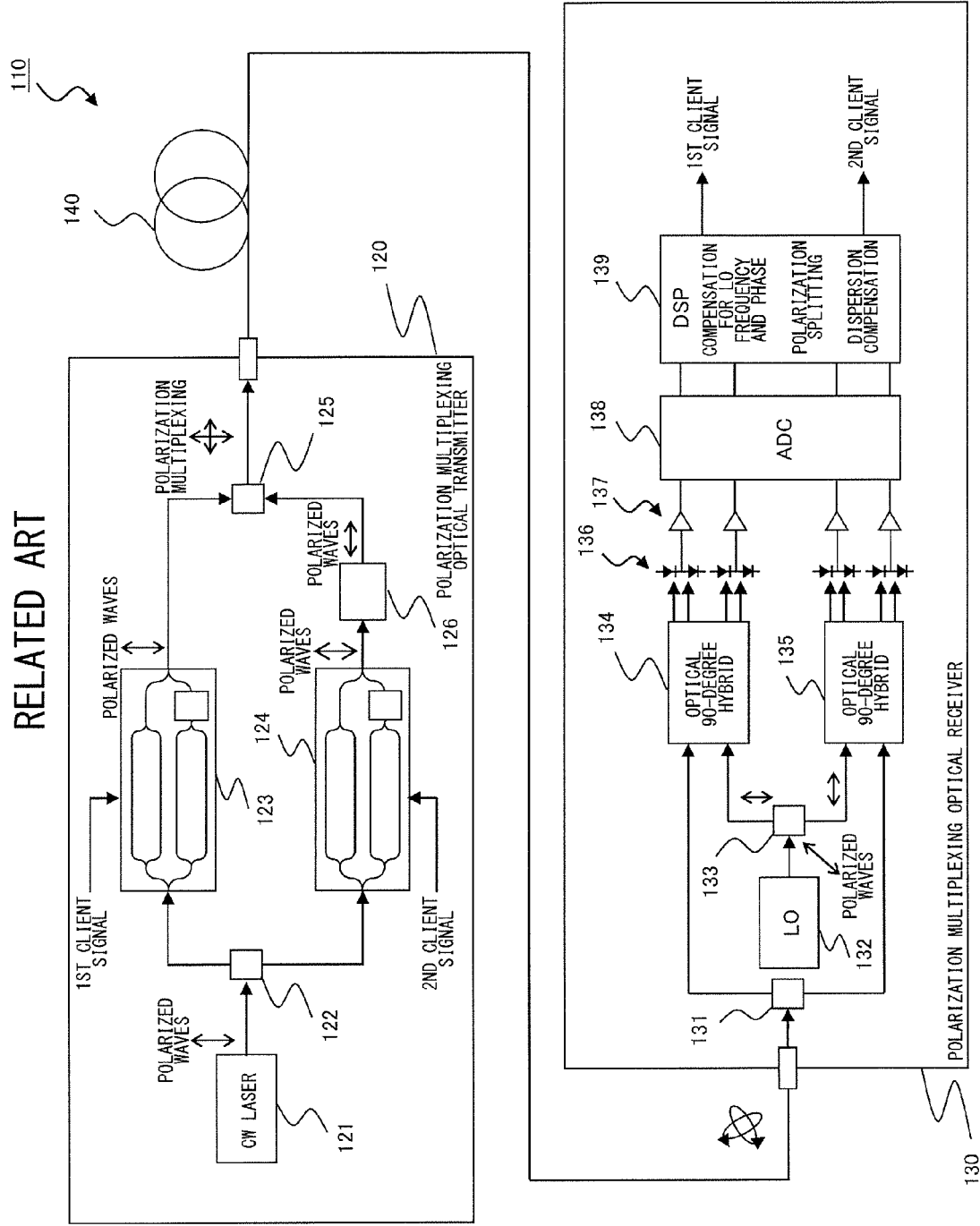
FIG. 1 is a block diagram showing an exemplary structure of a conventional digital coherent optical transmission system.
Figure 2:
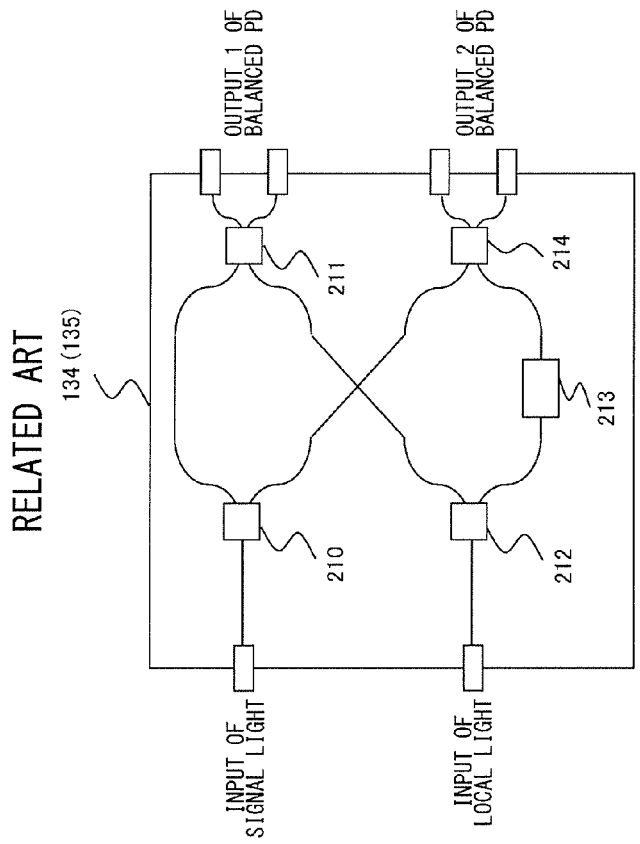
FIG. 2 illustrates an exemplary structure of an optical 90-degree hybrid circuit.
Figure 3:
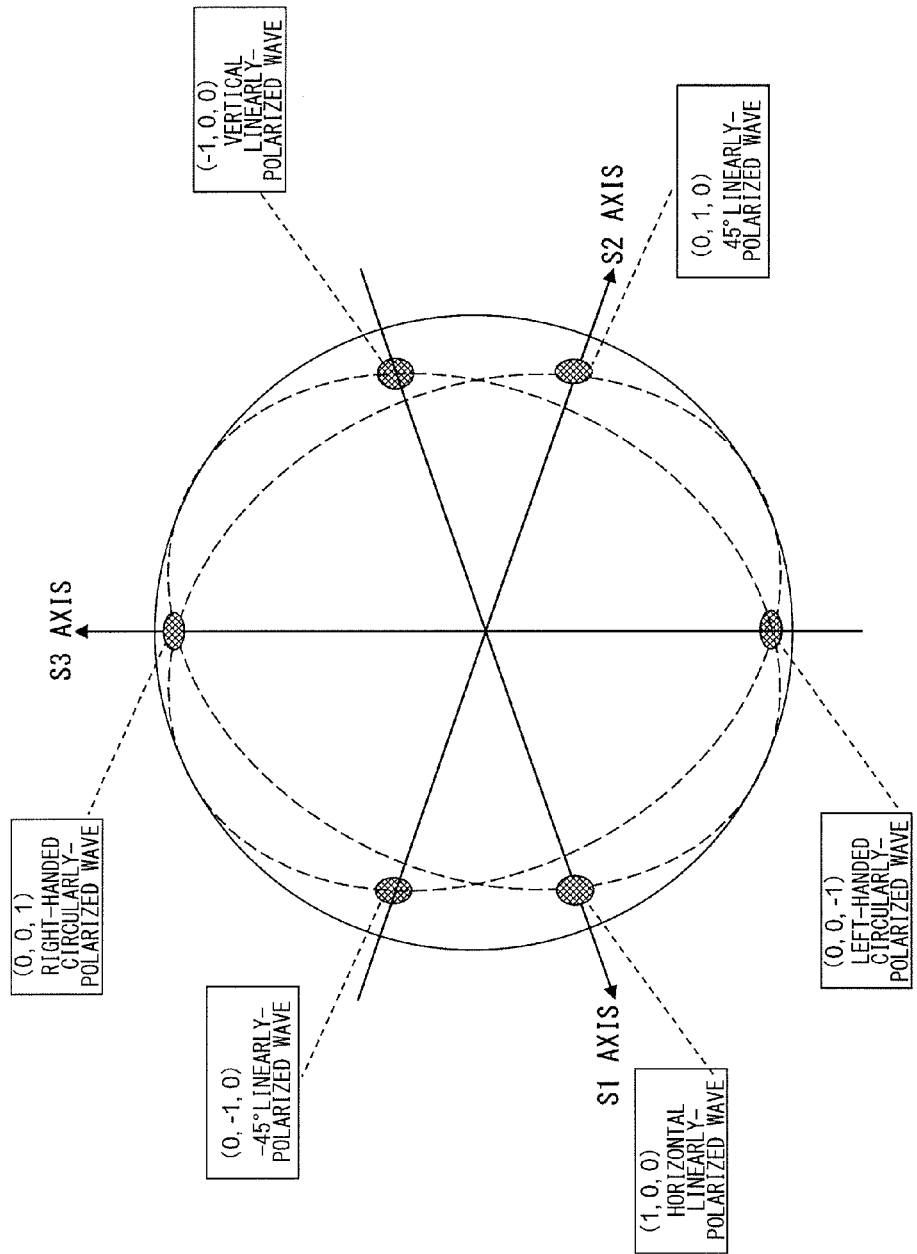
FIG. 3 is an illustration for explaining a Poincare sphere.
Figure 4:
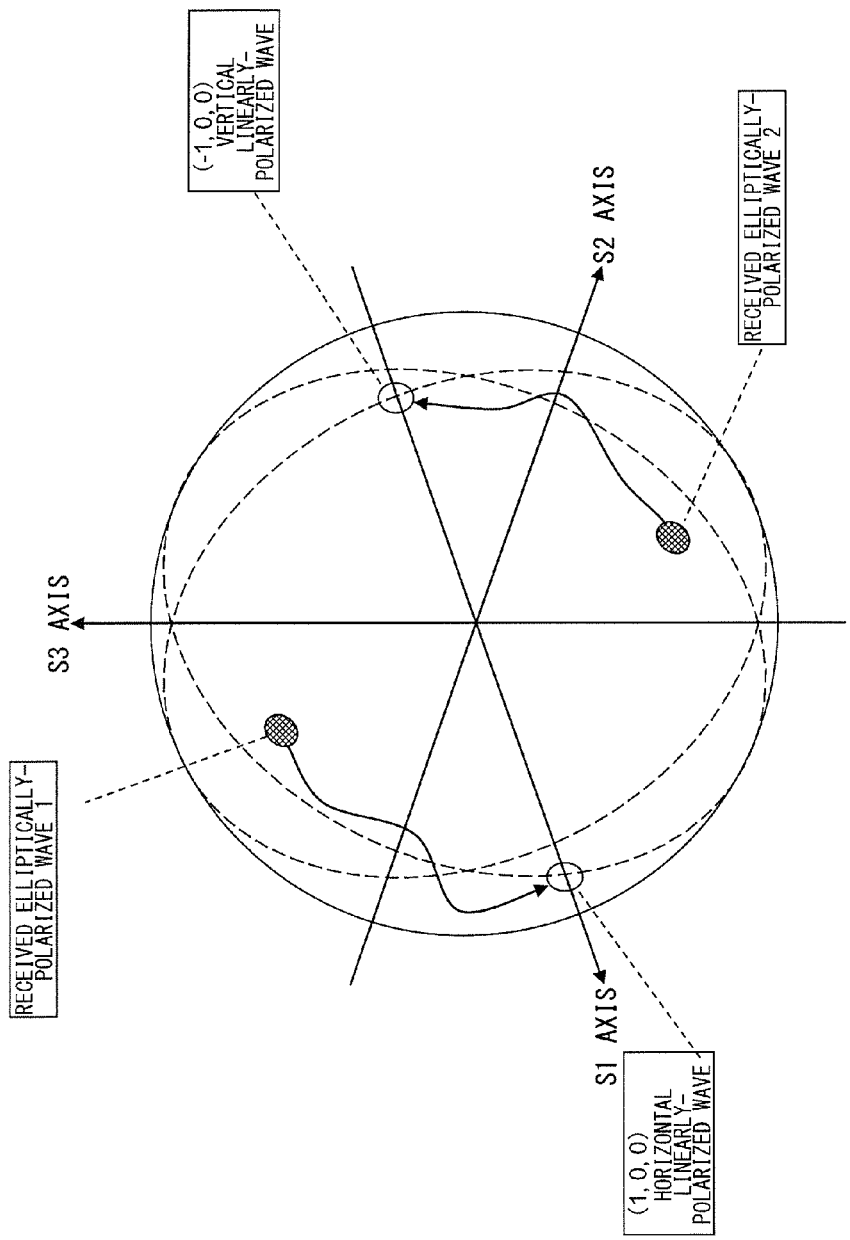
FIG. 4 is an illustration for explaining an example of polarization splitting in a digital coherent receiving method.

The invention will now be described by reference to the preferred embodiments. This does not intend to limit the scope of the present invention, but to exemplify the invention.

The best modes of carrying out the present invention will now be described in detail with reference to appended drawings. Note that in all of the Figures the same components are given the same reference numerals, respectively, and those with the identical reference numerals have their equivalent or similar structures and functions, respectively. Hence, the repeated description thereof is omitted as appropriate.

An optical transmission system according to one embodiment of the present invention comprises (i) an optical transmitter for transmitting an optical signal, where an X-polarized signal and a Y-polarized signal having predetermined frame structure are polarization-multiplexed, to an optical fiber transmission path and (ii) an optical receiver for receiving the optical signal that has propagated through the optical fiber transmission path.

Figure 5:
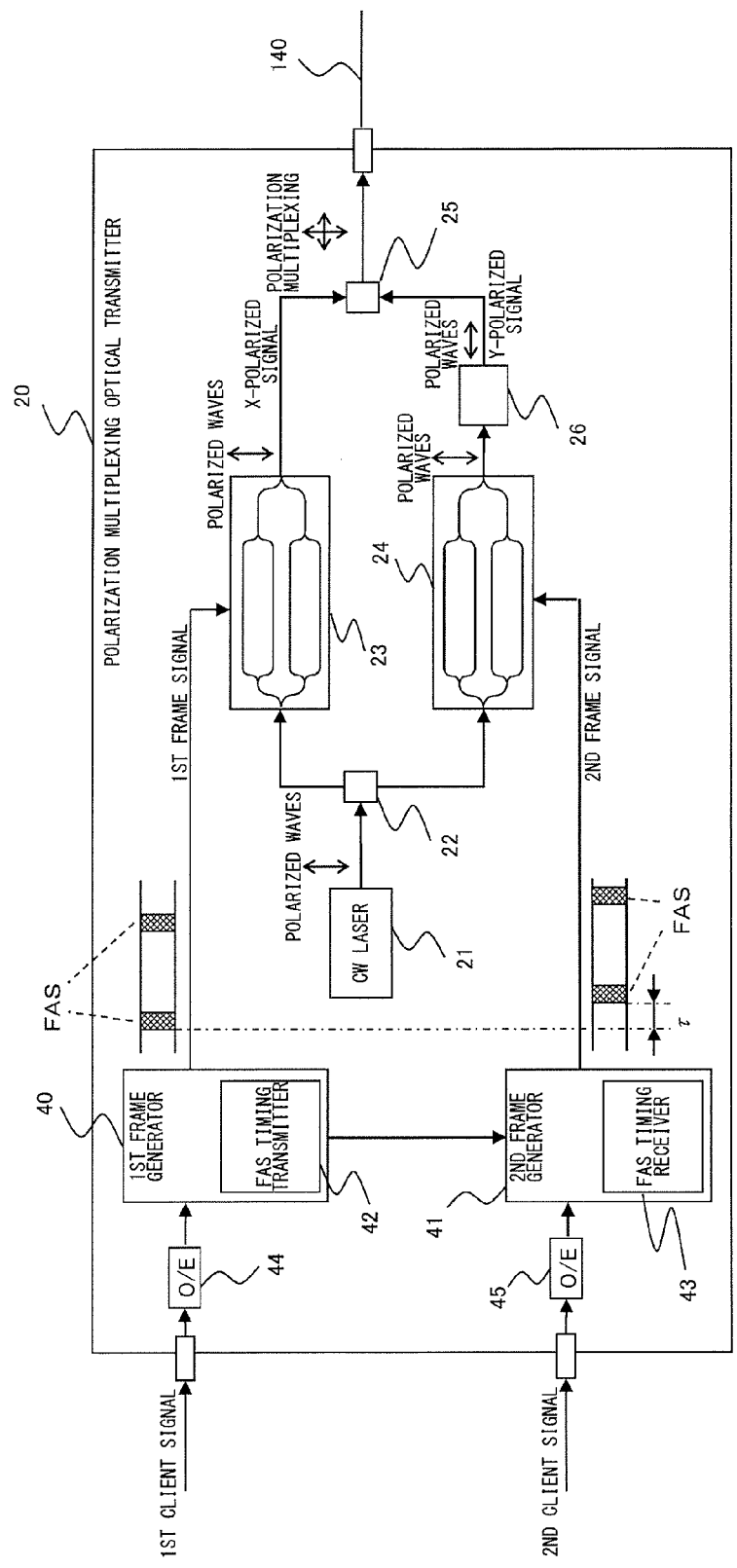
FIG. 5 is a block diagram showing a polarization multiplexing optical transmitter according to an embodiment.

A description is first given of a polarization multiplexing optical transmitter. FIG. 5 is a block diagram showing a polarization multiplexing optical transmitter 20 according to the present embodiment. As illustrated in FIG. 5, the polarization multiplexing optical transmitter 20 includes a CW laser 21, a 3 dB coupler 22, a first Mach-Zehnder modulator 23, a second Mach-Zehnder modulator 24, a ½ wavelength plate 26, a polarization beam coupler 25, a first frame generator 40, a second frame generator 41, and optical-to-electrical (O/E) converters 44 and 45.

The CW laser 21 outputs CW light. The CW light outputted from the CW laser 21 is split into two braches by the 3 dB coupler 22. One of the CW light beams split thereby is inputted to the first Mach-Zehnder modulator 23, whereas the other thereof is inputted to the second Mach-Zehnder modulator 24. The Mach-Zehnder modulator 23 externally modulates the one of the CW light beams in accordance with a given first frame signal, whereas the second Mach-Zehnder modulator 24 externally modulates the other thereof in accordance with a given second frame signal. The first frame signal and the second frame signal will be discussed later.

A Phase modulation method such as QPSK (Quadrature Phase Shift Keying), DPSK (Dual Phase Shift Keying) or the like may be used in the first and second Mach-Zehnder modulators 23 and 24. The IM-DD method may also be used. Further, a multi-level amplitude modulation, an orthogonal frequency modulation and so forth may be used in combination.

The optical signal outputted from the first Mach-Zehnder modulator 23 is inputted, as it is, to the X-axis side of the polarization beam coupler (PBC) 25. The optical signal outputted from the second Mach-Zehnder modulator 24 is inputted to the Y-axis side of the polarization beam coupler 25 after passing through the ½ wavelength plate 26. If the signals that have passed through the first Mach-Zehnder modulator 23 and the second Mach-Zehnder modulator 24 are both horizontal linearly-polarized waves, then the optical signal outputted from the second Mach-Zehnder modulator 24 will be converted to a vertical linearly-polarized wave by the ½ wavelength plate 26. The ½ wavelength plate 26 to be used may be one formed on the same waveguide as the modulator or an optical component using an anisotropic optical crystal. Also, polarization conversion may be performed by twisting a polarization-maintaining optical fiber (PMF or PM fiber) 90 degrees physically.

Hereinafter, the optical signal inputted to the X-axis side of the polarization beam coupler 25 will be referred to as the X-polarized signal, and the optical signal inputted to the Y-axis side thereof will be referred to as the Y-polarized signal. The X-polarized signal and the Y-polarized signal are polarized signals orthogonal to each other. The X-polarized signal and the Y-polarized signal are polarization-multiplexed by the polarization beam coupler 25 and then outputted to an optical fiber transmission path 140 as a polarization-multiplexed optical signal. The polarization beam coupler 25 to be used may, for instance, be one that converts the beams from the optical fiber into parallel beams via a lens system, performs a polarization coupling on them using an anisotropic optical crystal, and connects them to the fiber using a lens system again. The polarization beam coupler 25 to be used may also, for instance, one that is formed by heating, melting, and stretching two polarization maintaining optical fibers (e.g., PANDA fibers) which are arranged in parallel, with the polarization maintaining axis rotated 90 degrees.

Next, a description will be given of a first frame signal and a second frame signal to be inputted to the first Mach-Zehnder modulator 23 and the second Mach-Zehnder modulator 24, respectively. The first frame signal is a signal which is frame-structured from a first client signal inputted to the polarization multiplexing optical transmitter 20. Also, the second frame signal is a signal which is frame-structured from a second client signal inputted to the polarization multiplexing optical transmitter 20.

In the present embodiment, the first client signal and the second client signal are inputted to the polarization multiplexing optical transmitter 20 as optical signals. The first and second client signals inputted to the polarization multiplexing optical transmitter 20 are converted to electric signals by optical-to-electrical (O/E) converters 44 and 45, respectively, before they are inputted to the first frame generator 40 and the second frame generator 41, respectively.

Figure 6:
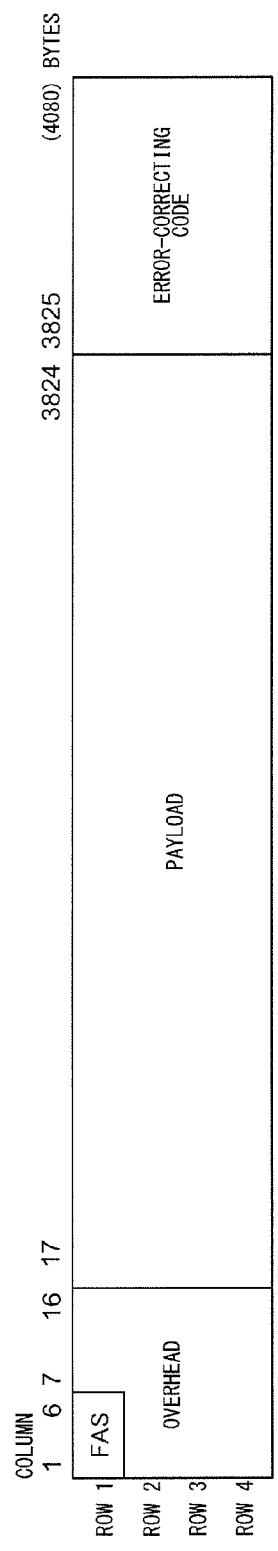
FIG. 6 illustrates an example of a frame structure.

The first frame generator 40 and the second frame generator 41 perform a frame-structuring on the inputted first client signal and second client signal, respectively. FIG. 6 illustrates an example of a frame structure. Hereinafter, the term "frame structure" may be used interchangeably with the term "frame construction" or "framing structure". The frame structure shown in FIG. 6 is one specified in the ITU-T G.709 standard. This frame is comprised of 4 rows, and each row has 4080 columns (4080 bytes). Columns 1 to 16 are called overhead, where various control signals are placed. Placed in columns 1 to 6 of row 1 of the overhead is a frame alignment signal (FAS) which indicates the leading position of a frame. The FAS is a fixed pattern of "F6 F6 F6 28 28 28". Also, columns 17 to 3824 are called payload, an area where actual data are placed. Also, columns 3825 to 4080 are the area where error-correcting code is placed. All the bytes except the FAS are scrambled. This frame is transmitted in such a manner that row 1 is first transmitted in the order of column 1 to column 4080 and then row 2, row 3, and row 4 in this order. In the case of OTU3 signal of 43 Gb/s, the frame frequency is:

43 Gb/s÷4 (rows)÷4080 (columns)÷8(bits)≈329 kHz and the frame period T is 3.035 ms. The X-polarized wave and the Y-polarized wave are modulated by the first frame signal and the second frame signal, respectively, into the X-polarized signal and the Y-polarized signal.

Figure 7:
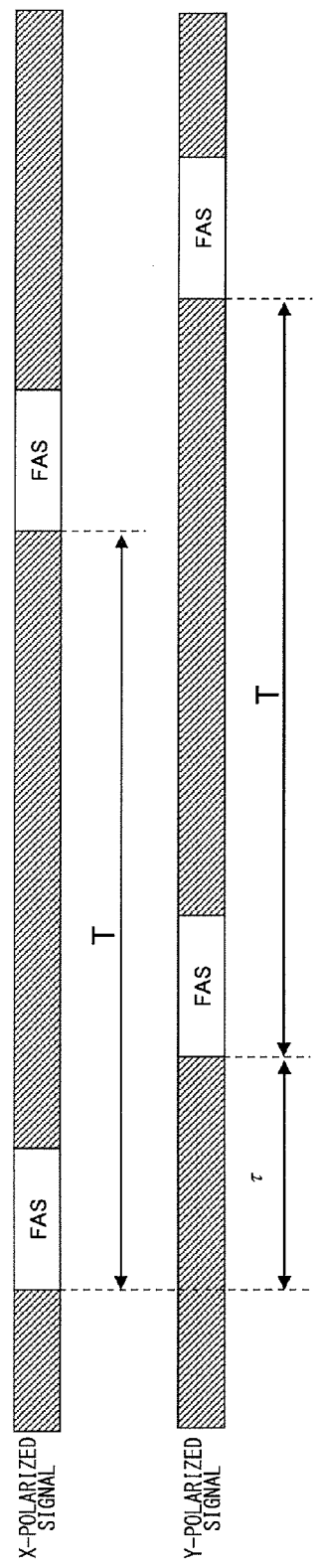
FIG. 7 is an illustration for explaining the transmission timing of FAS.

FIG. 7 is an illustration for explaining the transmission timing of FAS. FIG. 7 illustrates the frames of an X-polarized signal (first frame signal) and a Y-polarized signal (second frame signal). In the present embodiment, the X-polarized signal and the Y-polarized signal are both so designed as to repeat the frame at the same frame period T. As aforementioned, the FAS is a fixed data stream set without scrambling, whereas all the data other than the FAS are scrambled such that they are neither "O's in succession" nor "1's in succession". The X-polarized signal and the Y-polarized signal may be of exactly the same frame construction or of partially different frame construction so long as the frame period T is in agreement.

Note here that with the polarization multiplexing optical transmitter 20 according to the present embodiment, the signals are outputted such that the frame start position (the position of FAS) of the Y-polarized signal is a predetermined delay time τ behind that of the X-polarized signal as shown in FIG. 7. This delay time τ remains within a time width of several bits although it can vary slightly under the influence of polarization mode dispersion in the optical fiber transmission path 140. Therefore, the transmission with a delay time τ exceeding the above will result in a receiving by the receiver with the delay time τ nearly preserved. In the optical transmission system according to the present embodiment, the X-polarized signal and the Y-polarized signal are identified based on information on this delay time τ.

In order to generate a delay time τ like this, the first frame generator 40 of the polarization multiplexing optical transmitter 20 is provided with an FAS timing transmitter 42, and the second frame generator 41 thereof with an FAS timing receiver 43. When the first frame signal is outputted from the first frame generator 40, the FAS timing transmitter 42 outputs a timing signal of the FAS transmission to the FAS timing receiver 43. The second frame generator 41 outputs the second frame signal in such a timing that the FAS is transmitted a time τ behind the receiving of the timing signal by the FAS timing receiver 43. In this manner, a delay time τ can be generated between the FAS in the X-polarized signal and the FAS in the Y-polarized signal.

Figure 8:
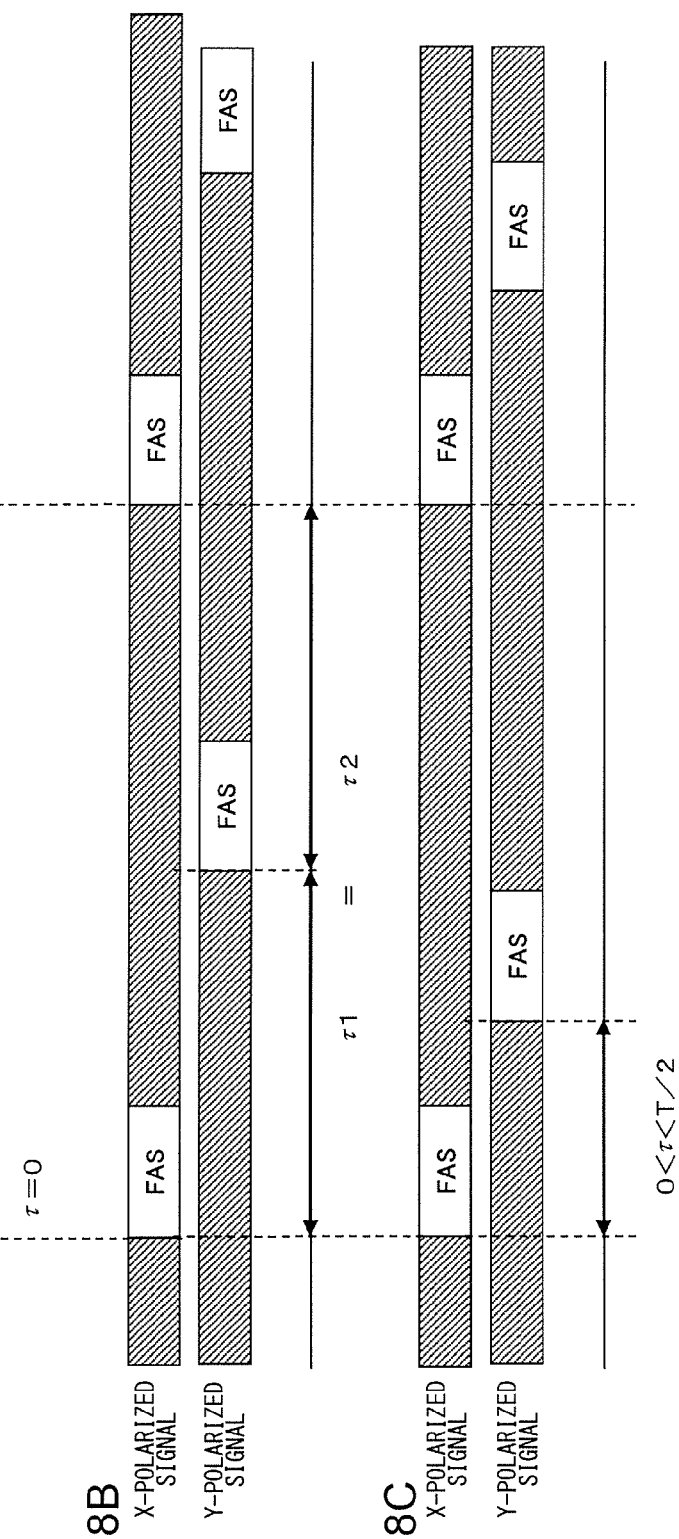
FIGS. 8A to 8C are illustrations for explaining the conditions for a desirable delay time.

FIGS. 8A to 8C are illustrations for explaining the conditions for a desirable delay time. FIG. 8A represents a case where the delay time is 0. In this case, the X-polarized signal and the Y-polarized signal cannot be identified, namely cannot be distinguished from each other, based on the delay time. Therefore, the delay time τ must be set to a value larger than 0.

FIG. 8B represents a case where the delay time τ is of a value equal to a half of the frame period T. In this case, the delay time τ1 from the FAS in the X-polarized signal to the FAS in the Y-polarized signal is no different from the delay time τ2 from the FAS in the Y-polarized signal to the next FAS in the X-polarized signal. If τ1 is no different from τ2, then the X-polarized signal and the Y-polarized signal cannot be identified based on the delay time. Therefore, the delay time τ must be set to a time length shorter than a half of the frame period T.

FIG. 8C illustrates a case where the delay time τ is set to a value larger than 0 and smaller than a half of the frame period T. The setting of the delay time τ like this allows the identification of, namely distinction between, the X-polarized signal and the Y-polarized signal properly. The delay time τ may be either fixed or variable. When it is fixed, however, the circuit configuration can be made simpler, thus presenting a cost advantage.

As mentioned earlier, a signal of 43 Gb/s as defined in ITU-T G.709 is such that the frame period T is of a slow speed of about 3 ms. When 100 G is transmitted by dual-polarization multiplexing, it will be about 50 G per polarization. In such a case, too, the frame period T will be about 2.5 ms if the same frame structure is used. The ratio of the time slot of 1 bit to the frame period T, which is constant for the same frame structure, is approximately equal to:

4 (rows)×4080 (columns)×8 (bits)=130560 times.

Here, let us consider how many bits of delay are to be given to the FAS in the Y-polarized signal in relation to the FAS in the X-polarized signal. If the above-mentioned conditions of the delay time τ being larger than 0 and smaller than T/2 are applied, then the delay permissible will be from 1 bit to 65279 bits. However, a phenomenon called polarization mode dispersion takes place within the optical fiber transmission path. In polarization mode dispersion, some differences in transmission speed occur between polarized waves due to causes such as the sectional form of the optical fiber being slightly off a true circle. And as a result, optical signals having entered the transmission path simultaneously keep spreading gradually with time. This phenomenon can be a factor for variation in the delay time τ set by the transmitter. Since the variation width exceeding the value of the delay time τ causes faulty identification of polarized waves at the receiver, the delay width must be so determined that such faulty identification does not occur. The variation width, however, cannot be definitely determined because it can also vary with the total transmission distance of multi-stage relaying or the characteristic of polarization mode dispersion in the optical transmission path. Yet, in the digital coherent receiving method, in which compensation for the polarization mode dispersion is performed, the difference is considered to be several bits at most, and therefore the delay by 8 bits or more will solve the problem. Accordingly, the delay time, which can be chosen within a very wide range of 8 to 65271 bits, provides an extremely high degree of freedom. In other words, it is not necessary to perform timing adjustment of super precision in units of 1 bit.

Figure 9:
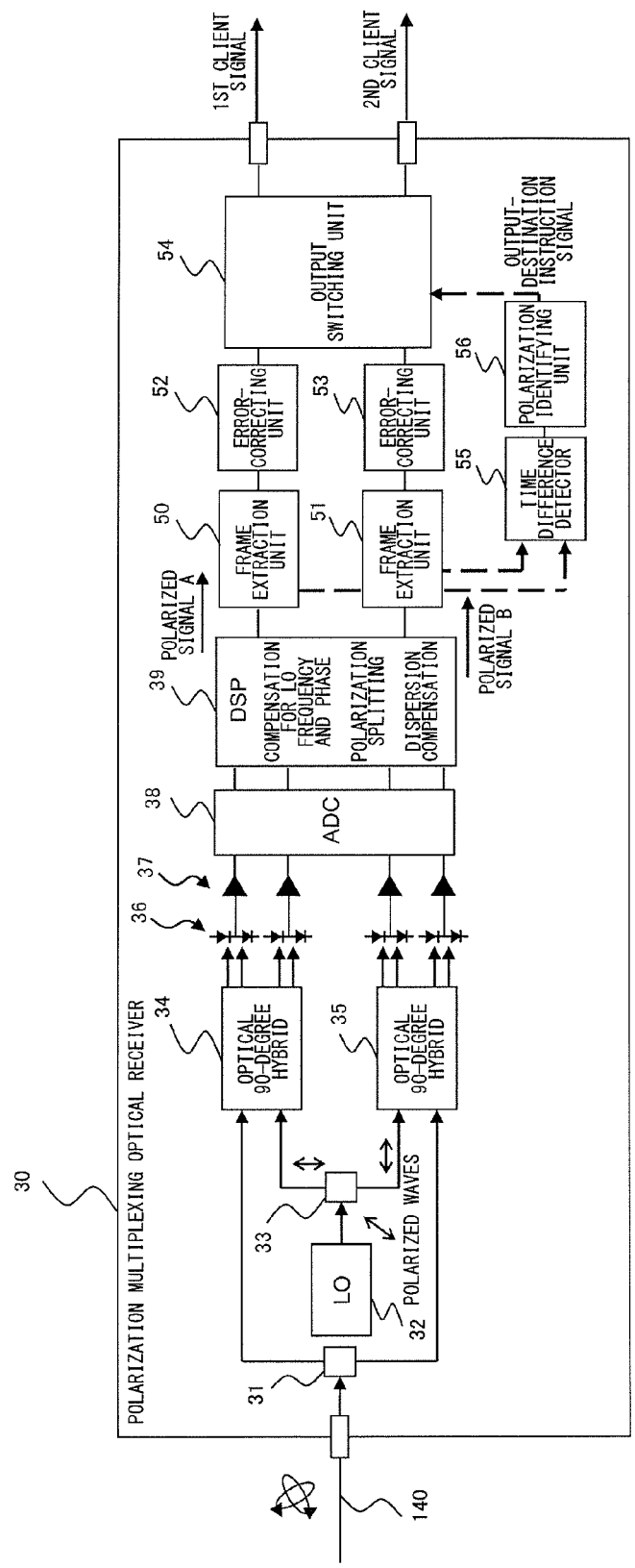
FIG. 9 is a block diagram showing a polarization multiplexing optical receiver according to an embodiment.

Next, a description is given of the polarization multiplexing optical receiver. FIG. 9 is a block diagram showing a polarization multiplexing optical receiver 30 according to the present embodiment. The polarization multiplexing optical receiver 30 is a polarization multiplexing receiver that performs orthogonal polarization splitting by the use of the polarization diversity method and the digital coherent receiving method.

As illustrated in FIG. 9, the polarization multiplexing receiver 30 includes a polarization beam splitter 31, a local oscillator 32, a polarization beam splitter 33, optical 90-degree hybrid circuits 34 and 35, a balanced photodiode 36, an electric amplifier 37, an ultrahigh-speed analog-to-digital converter (ADC) 38, a digital signal processor (DSP) 39, frame extraction units 50 and 51, error-correcting units 52 and 53, an output switching unit 54, a time difference detector 55, and a polarization identifying unit 56.

As described earlier, in the optical fiber transmission path 140, the polarization state of the signal as it is outputted from the polarization multiplexing optical transmitter 20 is not preserved, but the polarization-multiplexed optical signal changes into various polarization states such as linearly-polarized light, right-handed or left-handed circularly-polarized light, and elliptically-polarized light as it propagates therethrough. The polarization state, which is not constant temporally either, keeps changing under the influence of various disturbances to the optical fiber transmission path 140.

The polarization-multiplexed optical signal inputted to the polarization multiplexing receiver 30 is then inputted to the polarization beam splitter 31 with the two polarized waves mixed. In the polarization beam splitter 31, the polarization-multiplexed optical signal is split into two polarized waves. Also, outputted from the local oscillator 32 is a local light of nearly identical wavelength to that of the signal light. This local light is separated into two polarization components by the polarization beam splitter 33. The four polarization components split by the polarization beam splitters 31 and 33 are inputted to the optical 90-degree hybrid circuits 34 and 35, where the signal light and the local light are made to interfere with each other.

The optical signal received by the polarization multiplexing optical receiver 30 is split into two branches by the polarization beam splitter 31 and is further split into two branches by the optical 90-degree hybrid circuits 34 and 35, respectively. That is, the optical signal is split into a total of four optical signals by the optical circuit up to the optical 90-degree hybrid circuits 134 and 135. These four optical signals are subjected to photoelectric conversion by four balanced photodiodes 36.

The four electric signals outputted from the balanced photodiodes 36 are amplified by the electric amplifiers 37 and then digitized by the ADC 38. The signals digitized by the ADC 38 are inputted to the DSP 39 where they are subjected to compensation for frequency/phase shift, between the received signal light and the local light, and polarization splitting. Further, waveform shaping, such as wavelength dispersion compensation and polarization mode dispersion compensation, is performed at the DSP 39. Then, a clock is extracted by the DSP 39, and two polarized signals (called "polarized signal A" and "polarized signal B") are outputted. At this point, each of the polarized signals A and B cannot be identified as an X-polarized signal or Y-polarized signal.

The polarized signals A and B outputted from the DSP 39 are inputted to the frame extraction units 50 and 51, respectively. The frame extraction units 50 and 51 extract frames independently for the polarized signals A and B, respectively, and each extracts a header, a payload and an error-correcting code. The error-correcting units 52 and 53 perform error correction processing on the payloads, based on the error-correcting codes. Information on the error-corrected payloads are outputted to the output switching unit 54 as the client signals.

Figure 10:
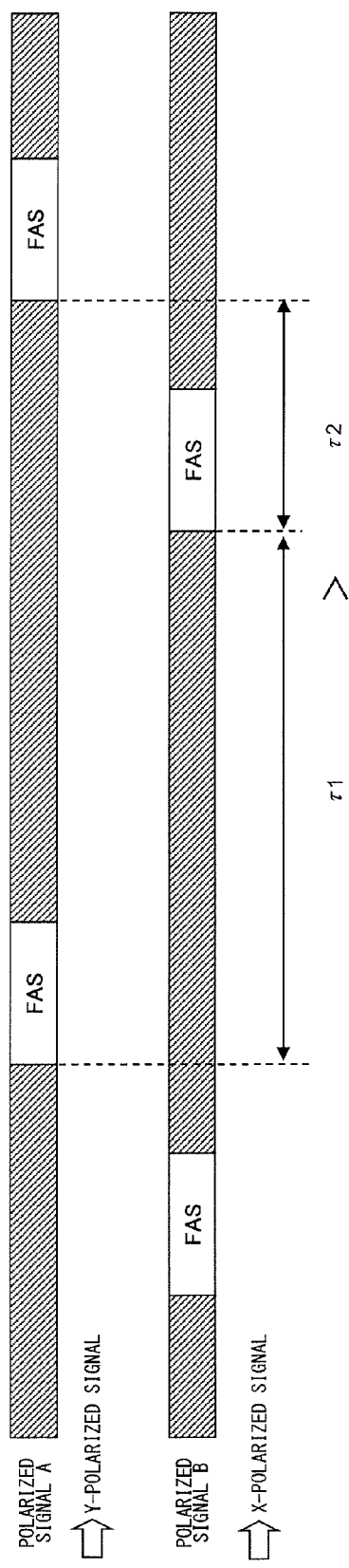
FIG. 10 is an illustration for explaining a method for identifying a polarized signal received.

FIG. 10 is an illustration for explaining a method for identifying a polarized signal received. Frames for polarized signals A and B are shown in FIG. 10.

The frame extraction units 50 and 51 output information on the FAS timings in the polarized signals A and B, to the time difference detector 55. The time difference detector 55 detects the time difference between the FAS in the polarized signal A and that in the polarized signal B based on the information. It is to be noted here that there are two kinds of time differences depending on whether the time difference therebetween is measured from the FAS in the polarized signal A or measured from that in the polarized signal B. More specifically, as shown in FIG. 10, there are time difference $\tau 1$ between the FAS in the polarized signal A and that in the polarized signal B, and time difference $\tau 2$ between the FAS in the polarized signal B and the next FAS in the polarized signal A. The time difference detector 55 outputs information on the thus detected time differences $\tau 1$ and $\tau 2$ to the polarization identifying unit 56.

The polarization identifying unit 56 compares the time difference $\tau 1$ with the time difference $\tau 2$ in magnitude. Since, in the polarization multiplexing optical transmitter 20, delay time $\tau$ is defined such that $0<$ delay time $\tau < T/2$, one finds that the smaller time difference (i.e., $\tau 2$ in the example shown in FIG. 10) is the delay time $\tau$ set at a transmitter. As for the time difference $\tau 2$ which is the smaller of the time differences, the polarization identifying unit 56 identifies that the polarized signal B, in which FAS is positioned anteriorly in terms of time, is an X-polarized signal. At same time, the polarization identifying unit 56 identifies that the polarized signal A, in which FAS is positioned posteriorly in terms of time, is a Y-polarized signal. In this manner, the X-polarized signal and the Y-polarized signal can be distinguished from each other. Identification information on X- and Y-polarized signals is sent to the output switching unit 54 as an output-destination instruction signal.

The output switching unit 54 switches the output destinations of the polarized signals A and B, based on the identification result of the polarization identifying unit 56, and outputs the client signal to an appropriate output port. The client signal is normally electrical-to-optical (E/O) converted and then outputted as an optical signal. Several different structures and arrangements of the output switching unit 54 may be conceivable as follows.

Figure 11:
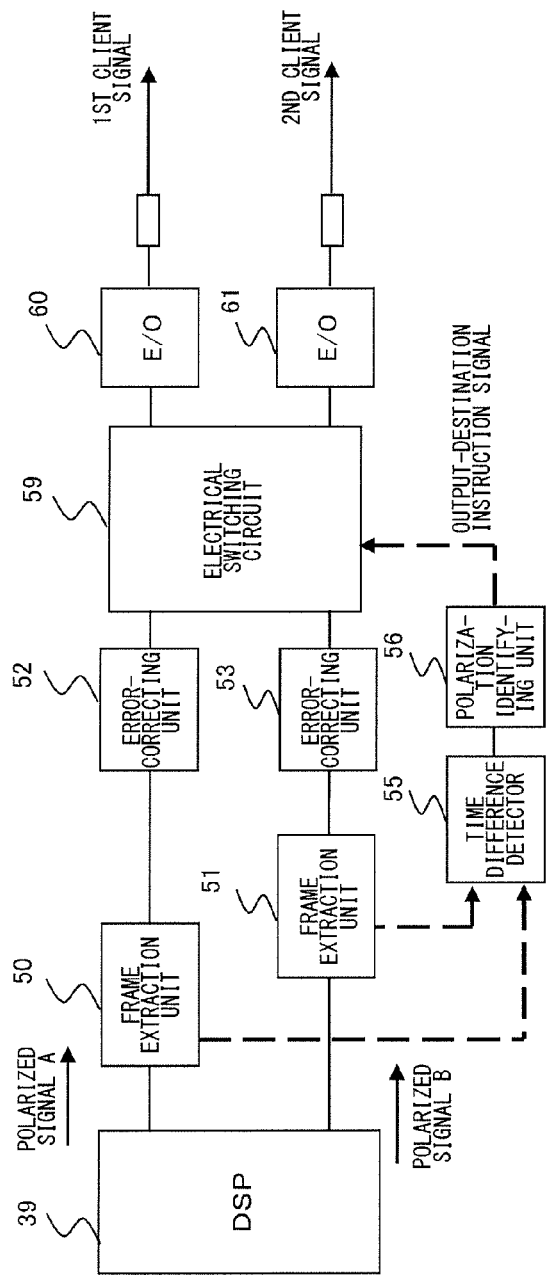
FIG. 11 is an illustration for explaining an exemplary structure of an output switching unit.

FIG. 11 is an illustration for explaining an exemplary structure of an output switching unit. In the exemplary embodiment as illustrated in FIG. 11, the polarized signals A and B outputted from the error-correcting units 52 and 53 are inputted to an electrical switching circuit 59 that performs electrical switching functions. The electrical switching circuit 59 switches the output destination, based on the output-destination instruction signal fed from the polarization identifying unit 56. Electrical-to-optical (E/O) converters 60 and 61 are provided subsequent to the electrical switching circuit 59. The E/O converters 60 and 61 output a first client data signal and a second client data signal as optical signals, respectively.

Figure 12:
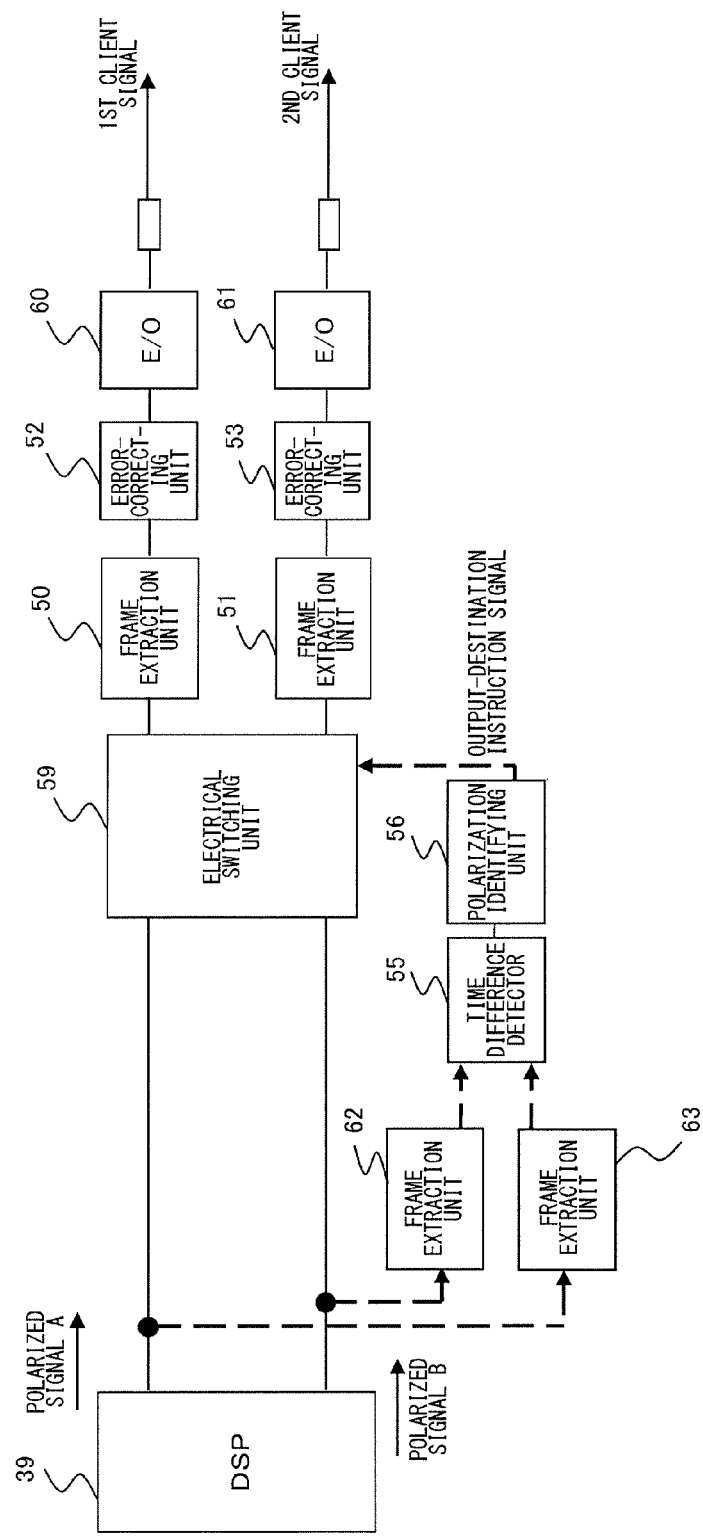
FIG. 12 is an illustration for explaining another exemplary structure of an output switching unit.

FIG. 12 is an illustration for explaining another exemplary structure of the output switching unit. In the exemplary structure as illustrated in FIG. 12, each of the polarized signals A and B is split into two branches. One branch of each of the polarized signals A and B is outputted to the electrical switching circuit 59. The other branch of the polarized signal A is outputted to the frame extraction unit 62, and the other branch of the polarized signal B is outputted to the frame extraction unit 63. A time difference detector 55 and a polarization identifying unit 56 are provided subsequent to the frame extraction units 62 and 63. The time difference detector 55 and the polarization identifying unit 56 identify each of the polarized signals A and B as an X-polarized signal or a Y-polarized signal, based on the other branch of each of the polarized signals A and B, and then outputs the output-destination instruction signal to the electrical switching circuit 59. Based on this output-destination signal, the electrical switching circuit 59 switches the output destination of the polarized signals A and B. The polarized signals A and B, which have thus been switched to the appropriate output destination, are extracted by the frame extraction units 50 and 51 before they undergo the error correction processing through the error-correcting units 52 and 53, respectively. The thus error-corrected electric signals are converted to optical signals by the E/O converters 60 and 61 and outputted as a first client data signal and a second client data signal, respectively.

Figure 13:
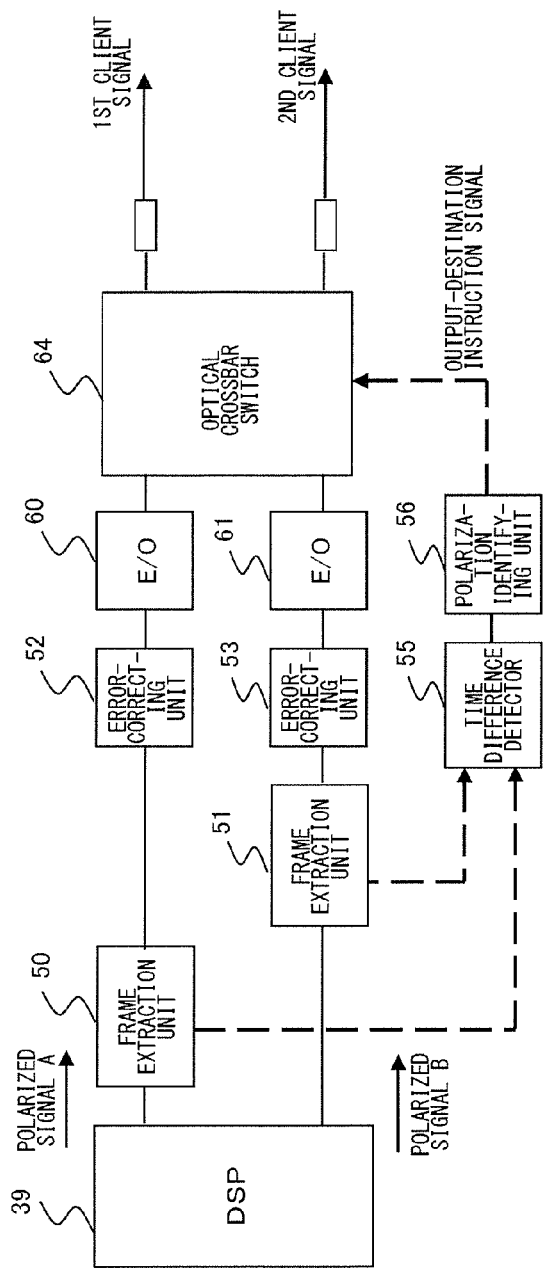
FIG. 13 is an illustration for explaining still another exemplary structure of an output switching unit.

FIG. 13 is an illustration for explaining still another exemplary structure of the output switching unit. In the exemplary structure as illustrated in FIG. 13, the output destinations of the polarized signals A and B are switched by an optical crossbar switch 64. In the present exemplary embodiment, the polarized signals A and B each undergoes processes up to the electrical-to-optical (E/O) conversion by the E/O converters 60 and 61, and two optical signals are inputted to the two-by-two crossbar optical switch 64. The optical crossbar switch 64 performs output-destination switching control of the optical signals, based on the output-destination instruction signal fed from the polarization identifying unit 56, and then outputs the first client signal and the second client signal to the appropriate output destinations.

A description has so far been given of the structure and arrangement using the polarization diversity and digital coherent receiving method. It is to be noted here that the above-described method for identifying the polarized signals is applicable to the polarization multiplexing optical receiver that performs orthogonal polarization splitting by the use of a polarization controller.

Figure 14:
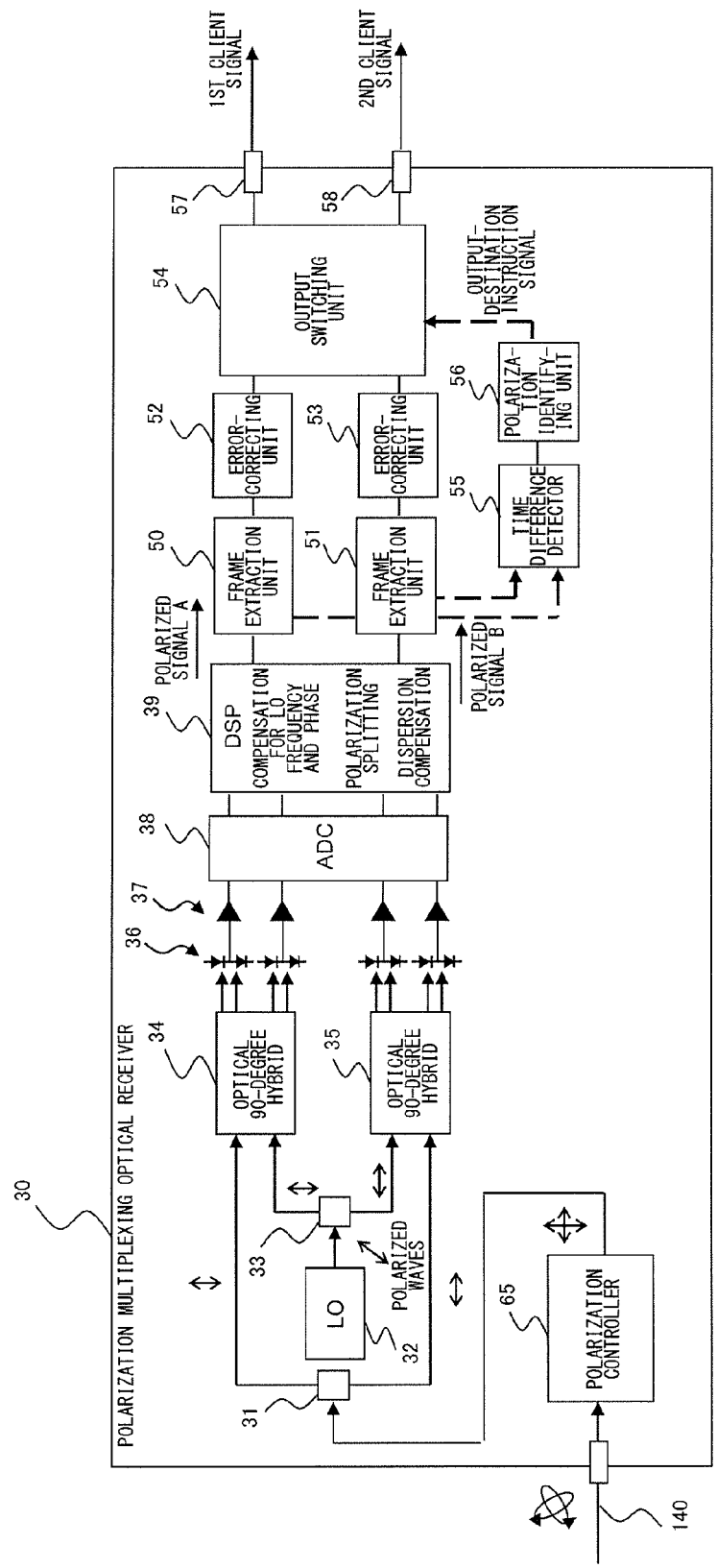
FIG. 14 is a block diagram showing a polarization multiplexing optical receiver using a polarization controller.

FIG. 14 is a block diagram showing a polarization multiplexing optical receiver 30 using the polarization controller. This polarization multiplexing optical receiver 30 differs from the polarization multiplexing receiver of FIG. 1 in that a polarization controller 65 is provided before the polarization beam splitter 31.

In this embodiment, the polarization-multiplexed optical signal having two polarized waves mixed in the optical fiber transmission path 140 is first inputted to the polarization controller 65. The polarization controller 65 converts the two polarized waves into horizontal and vertical linearly-polarized waves. Then the thus converted waves are inputted to the polarization beam splitter 31 in alignment with the split axes. This may be expressed as follows. That is, the polarization controller 65 performs control in such a manner as to match the axes of the polarization beam splitter 31. The two separated polarized waves are optical-to-electrical (O/E) converted by the balanced photodiodes 36, respectively, which in turn reproduces signals. Similar to the already-described methods, this processing can identify which of the two polarized signals is the X-polarized signal or Y-polarized signal.

As described above, the optical transmission system according to the present embodiment can easily resolve the problem by the use of a simple circuitry and apparatus construction. Here, the problem is that the two polarized waves cannot be distinguished from each other at a receiving side of the optical transmission system where the optical transmitter and the receiver using a polarization multiplexing optical transmission method are configured in combination. Even if the quality of the transmission path is low and the error rate of signals is high, the polarized waves can be correctly identified continuously unless a loss of frame (LOF) occurs. Since a threshold for LOF is generally lower than that for signal error, the line quality can be maintained at a proportionately higher level.

Figure 15:
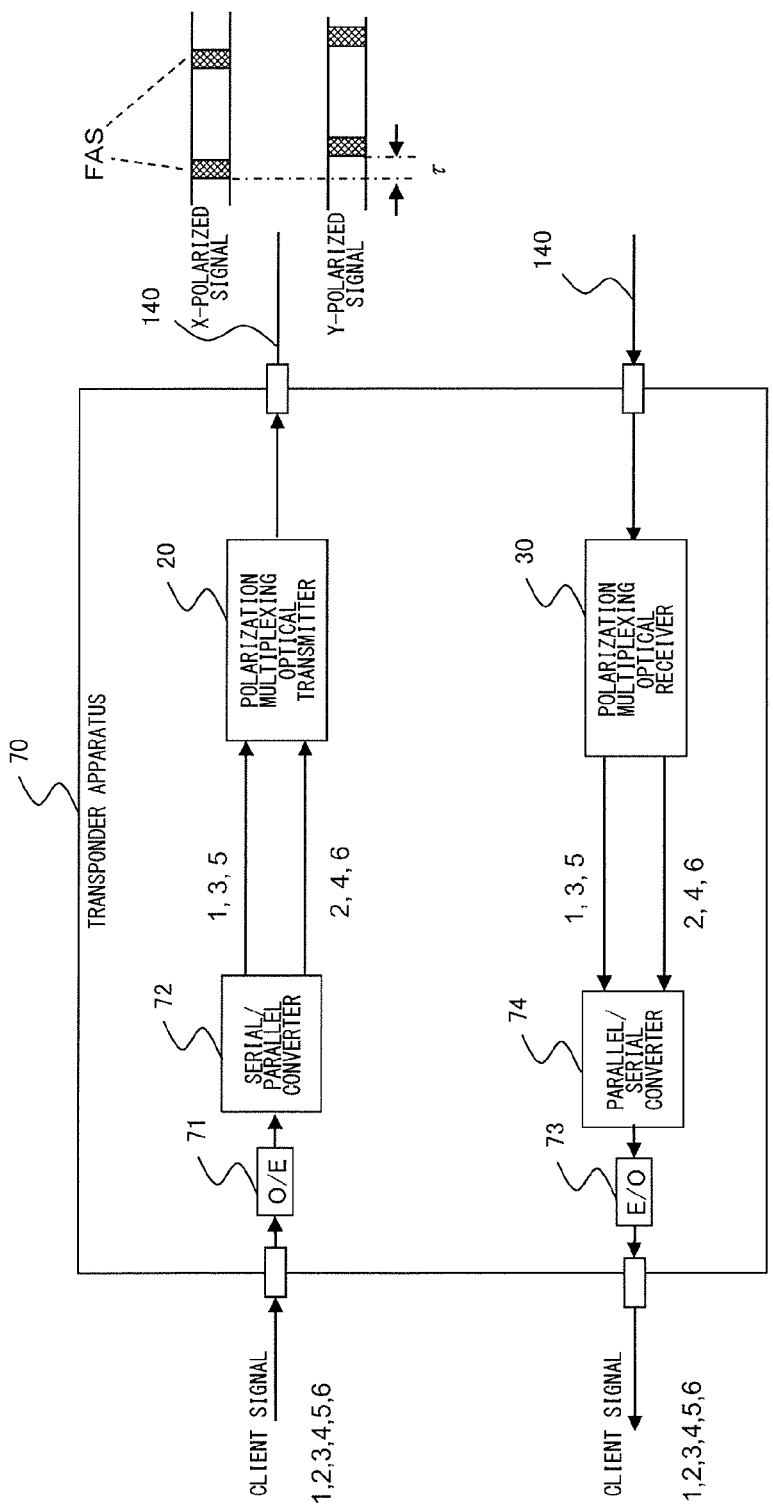
FIG. 15 illustrate an exemplary structure of a transponder apparatus.

A description is now given of a transponder apparatus configured by using the above-described polarization multiplexing optical transmitter 20 and polarization multiplexing optical receiver 30. The transponder apparatus has a function of receiving the input of client signals and converting them into optical signals suitable for the optical fiber transmission path and a function of restoring the optical signals received from the optical fiber transmission path into the client signals. FIG. 15 illustrate an exemplary structure of the transponder apparatus.

In the transponder apparatus that polarization-multiplexes the client signal of 100 Gb/s, for example, the optical signal of 100 Gb/s is first optical-to-electrical (O/E) converted by the O/E converter 71. Then, this signal undergoes serial/parallel conversion by a serial/parallel converter 72 so as to obtain two signals of 50 Gb/s each. Then, these two signals are inputted to two data input units of the polarization multiplexing transmitter 20 as shown in FIG. 5, and each of the two signals is stored in a frame. After this, the X-polarized wave and the Y-polarized wave, which are orthogonal to each other, are modulated. The thus modulated X-polarized signal and the Y-polarized signal are polarization-multiplexed and then outputted to the optical fiber transmission path 140. At this time, as described above, the frames are outputted in such a manner that the FAS in the Y-polarized signal is delayed, by the predetermined delay time τ, relative to the FAS in the X-polarized signal.

The polarization multiplexing optical receiver 30 performs polarization splitting on the polarization-multiplexed optical signal from the optical fiber transmission path 140, into two signals. Then the polarization multiplexing optical receiver 30 performs error correction on the two signals, respectively, and extracts payloads from the frames, thereby obtaining two signals of 50 Gb/s each. Then, the two signals are parallel-to-serial converted in the correct order, and the thus converted signals are outputted as the original client signal of 100 Gb/s.

As described above, the delay time τ between the X-polarized wave and the Y-polarized wave is set with a high degree of freedom. Thus, for example, the following structure may be implemented. When the serial/parallel conversion is performed at a receiving side of the transponder apparatus, the signals are sorted out, per byte (8 bits), as the X-polarized signal and the Y-polarized signal and the time duration of one byte is selected as τ. In such a case, τ is received at a receiving side thereof as the time difference of one byte as well, so that the original signal can be generated after the parallel-to-serial conversion is performed directly.

Figure 16:
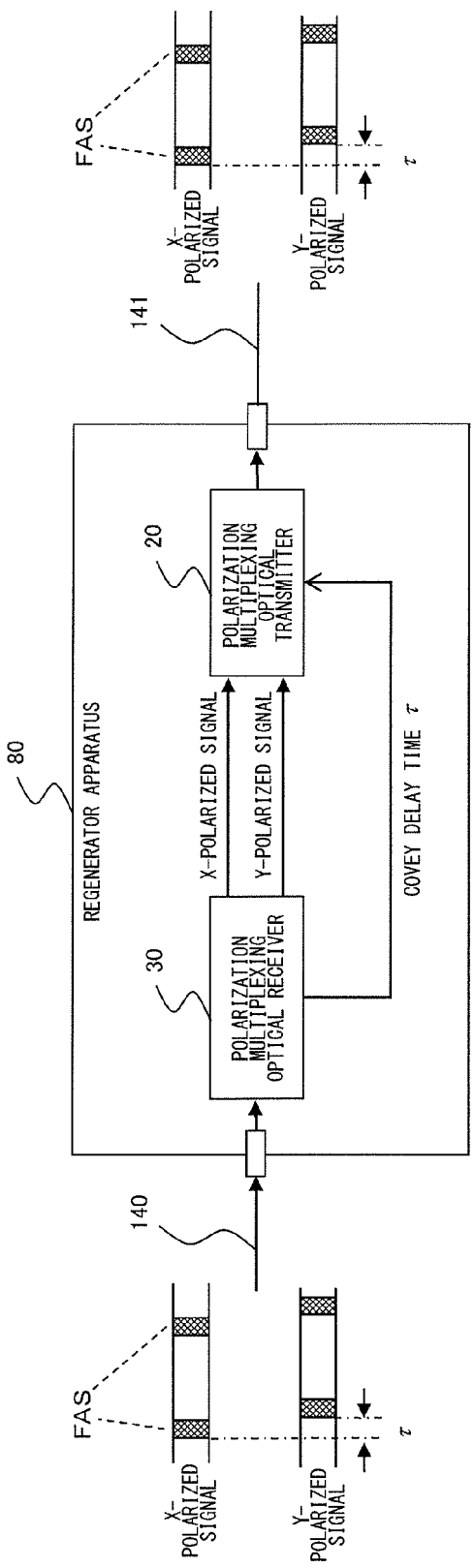
FIG. 16 illustrates an exemplary structure of a regenerator apparatus.

A description is now given of a regenerator apparatus 80 configured by using the above-described polarization multiplexing optical transmitter 20 and polarization multiplexing optical receiver 30. The regenerator apparatus functions as follows. The amplification and relay by the light has a limitation when the signals are transmitted over long distances; this is because, for example, the optical signal-to-noise ratio degrades. For this reason, there is provided a regenerator that once converts the signals into electric signals and then again electrical-to-optical (E/O) converts them after the identification and reproduction so as to transmit the converted signals to the transmission path. FIG. 16 illustrates an exemplary structure of the regenerator apparatus.

The regenerator apparatus 80 shown in FIG. 16 receives optical signals, by the polarization multiplexing optical receiver 30 shown in FIG. 9 or FIG. 14, from the optical fiber transmission path 140 and then outputs the two-system signal to an optical fiber transmission path 141 by the polarization multiplexing optical transmitter 20. At this time, the polarization multiplexing optical receiver 30 conveys the delay time τ to the polarization multiplexing optical transmitter 20. Note here that the delay time τ between the X-polarized signal and the Y-polarized signal is detected from the signal received by the polarization multiplexing optical receiver 30. The polarization multiplexing optical transmitter 20 sets the same delay time as the delay time τ and generates a frame. Then the polarization multiplexing optical transmitter 20 modulates the X-polarized wave and the Y-polarized wave using the modulation data and outputs them to the optical fiber transmission path 141. By employing such a regenerator apparatus 80 configured above, the polarized waves can be corrected identified by the receive-side transponder apparatus even if the regenerator apparatus 80 is installed in the transponder apparatus.

Figure 17:
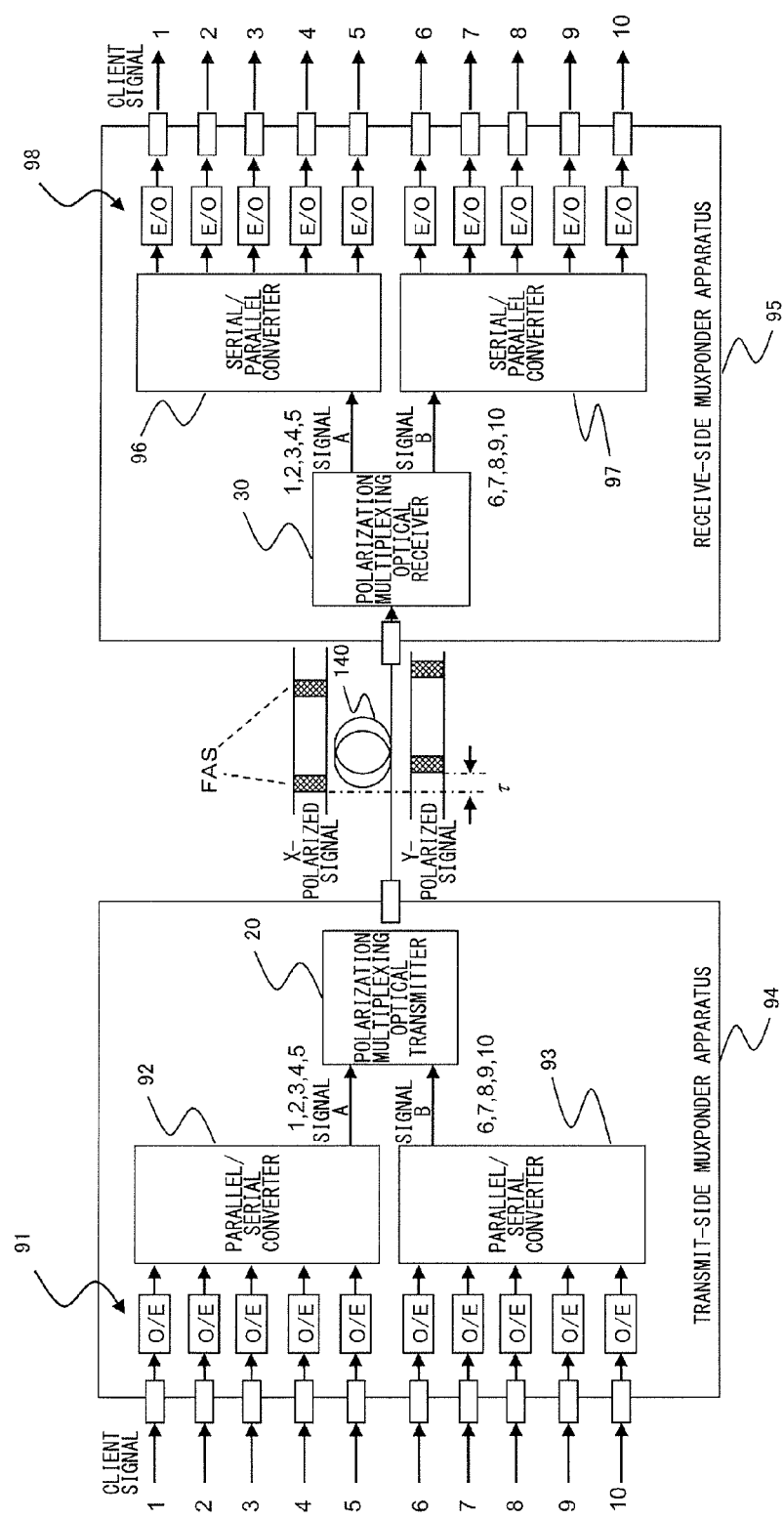
FIG. 17 illustrates an exemplary structure of a muxponder apparatus.

A description is next given of a muxponder apparatus configured by using the above-described polarization multiplexing optical transmitter 20 and polarization multiplexing optical receiver 30. The muxponder apparatus receives the input of a plurality of low-speed client signals, and performs parallel-to-serial conversion on them so as to output the converted signal as a high-speed signal. FIG. 17 illustrates an exemplary structure of the muxponder apparatus.

The muxponder apparatus may be used to multiplex-transmit the even number of signals (the even number meant here being greater than or equal to four). Note that two signals may be multiplex-transmitted using by the polarization multiplexing optical transmitter 20 shown in FIG. 5 and the polarization multiplexing optical receiver 30 shown in FIG. 9 or FIG. 14. Here, consider a case, for example, that ten client signals of 100 Gb/s are multiplexed and transmitted by the muxponder apparatus.

In a transmit-side muxponder apparatus 94, a total of ten signals consisting of signal 1 of 10 Gb/s to signal 10 of 10 Gb/s are optical-to-electrical (O/E) converted by an O/E converter 91. Then these ten signals are split into two branches each of which has five signals. The two branches consisting of signal 1 to signal 5 and signal 6 to signal 10 are parallel-to-serial converted by parallel-to-serial converters 92 and 93, respectively, and two signals consisting of signal A of 50 Gb/s and signal B of 50 Gb/s are generated. Signal A and signal B are each stored in a frame, and the frames storing them are outputted by the polarization multiplexing optical transmitter 20 to the optical fiber transmission path 140 as the polarization-multiplexed signals.

In a receive-side muxponder apparatus 95, the optical signal received by the polarization multiplexing optical receiver 30 shown in FIG. 9 or FIG. 14 is polarization-split and outputted and then the thus polarization-split signals undergo the identification of polarized signals. As a result, the X-polarized signal is identified as signal A whereas the Y-polarized signal is identified as signal B, for instance. Each of the identified signals undergoes error correction, so that payloads are extracted from the frames. Then signal A is serial-to-parallel converted by a serial-to-parallel converter 96 so as to reproduce signal 1 to signal 5. Signal B is serial-to-parallel converted by a serial-to-parallel converter 97 so as to reproduce signal 6 to signal 10. Electrical-to-optical (E/O) converters 98 perform E/O conversion on signals 1 to 10, respectively, so as to output them as client signals 1 to 10.

Figure 18A:
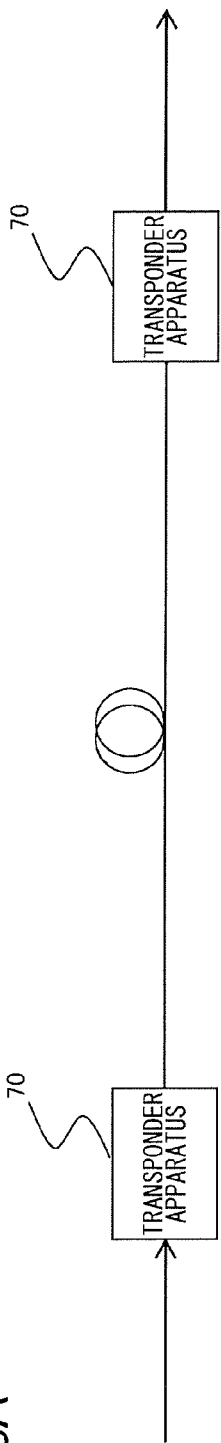
FIGS. 18A to 18C illustrate various types of optical transmission systems.
Figure 18B:
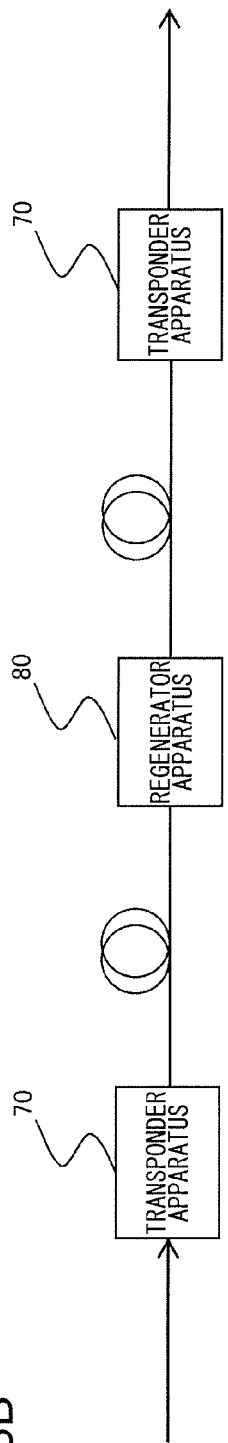
Figure 18C:
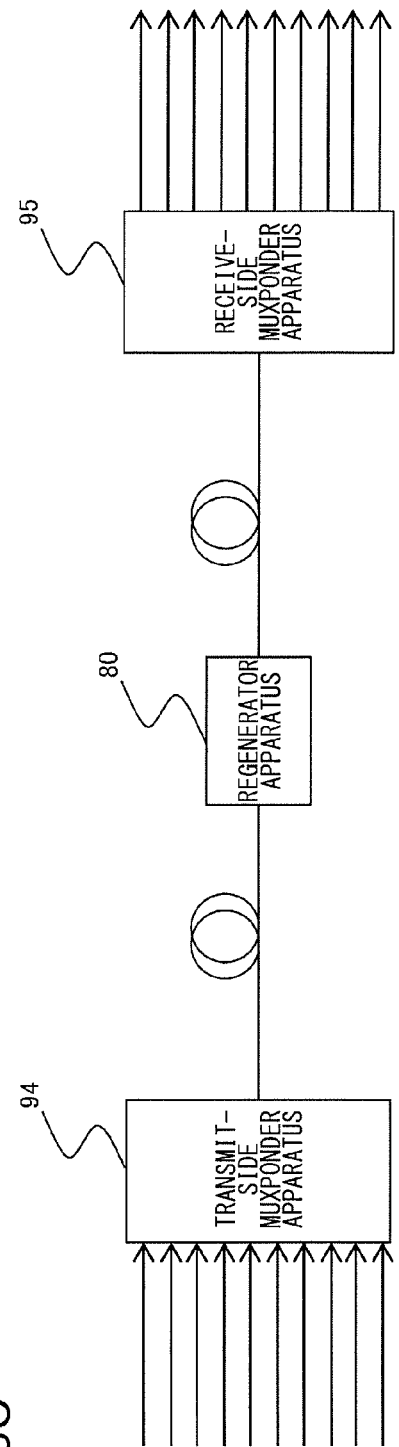

Various kinds of optical transmission systems may be constructed by combining the transponder apparatus, the regenerator apparatus, the muxponder apparatus as described above and the like. FIGS. 18A to 18C illustrate such various kinds of optical transmission systems. FIG. 18A illustrates an optical transmission system where the transponder apparatuses 70 shown in FIG. 15 are placed counter to each other. FIG. 18B illustrates an optical transmission system where the regenerator apparatus 80 shown in FIG. 16 is provided between the transponder apparatuses 70 placed counter to each other. FIG. 18C illustrates an optical transmission system where the regenerator apparatus 80 is provided between the transmit-side muxponder apparatus 94 and the receive-side muxponder apparatus 95 which are placed counter to each other. In the optical transmission systems shown in FIGS. 18B and 18C, a plurality of regenerators 80 may be arranged in tandem. Also, a structure may be such that the polarization-multiplexed signal is further wavelength-multiplexed by an arrayed waveguide grating filter or the like and then amplified and relayed in a multi-stage manner by optical amplifiers.

Figure 19:
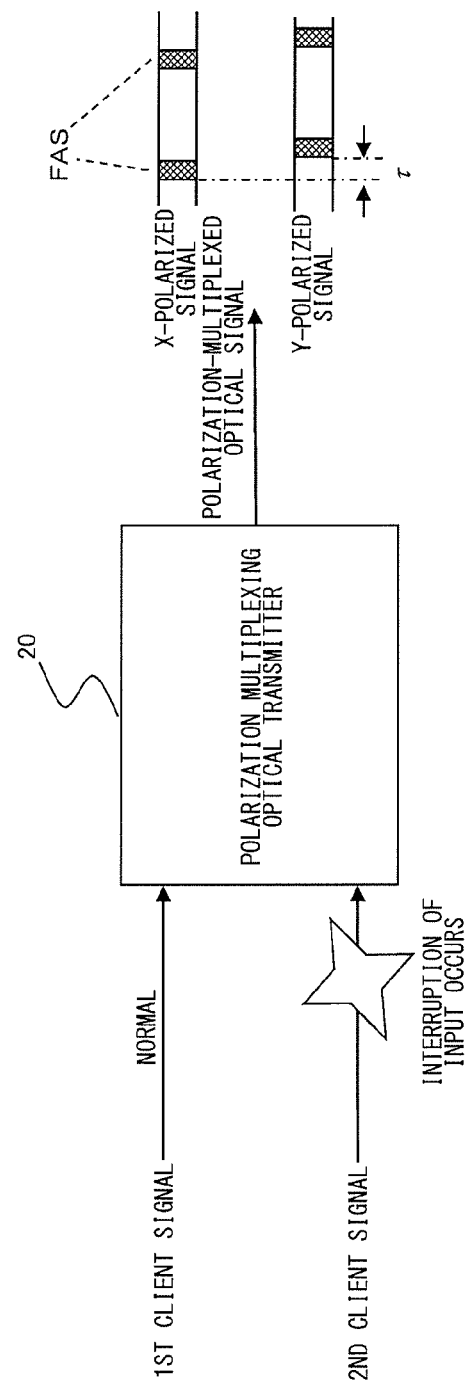
FIG. 19 is an illustration for explaining an operation of a polarization multiplexing optical transmitter when the input of a signal is interrupted.

FIG. 19 is an illustration for explaining an operation of the polarization multiplexing optical transmitter when an input is disconnected or interrupted. In the optical transmission system according to the present embodiments, the X-polarized signal and the Y-polarized signal are distinguished from each other based on the time difference between the FASs in the two polarized signals. Hence, if either one of the signals stops, the X-polarized signal and the Y-polarized signal may not be identified.

According to the present embodiment, therefore, the polarization multiplexing optical transmitter 20 continues to transmit a polarized signal in which a scrambled signal has been frame-structured, even if the input of one of the client signals is interrupted or stops. And the polarization multiplexing optical transmitter 20 continues to carry out the processing of supplying the delay time τ between the polarized signal, in which this scrambled signal has been frame-structured, and a normal polarized signal. Hence, in the event that the input of one of the client signals stops, the normal service can be provided continuously without adversely affecting the other client signal. Also, in the event that the input of both the first client signal and the second client signal is interrupted or stops, the line can be reopened no matter whether there are input signals or not. Thus, once the line is recovered, the communications of signals can be restored to normal.

Figure 20:
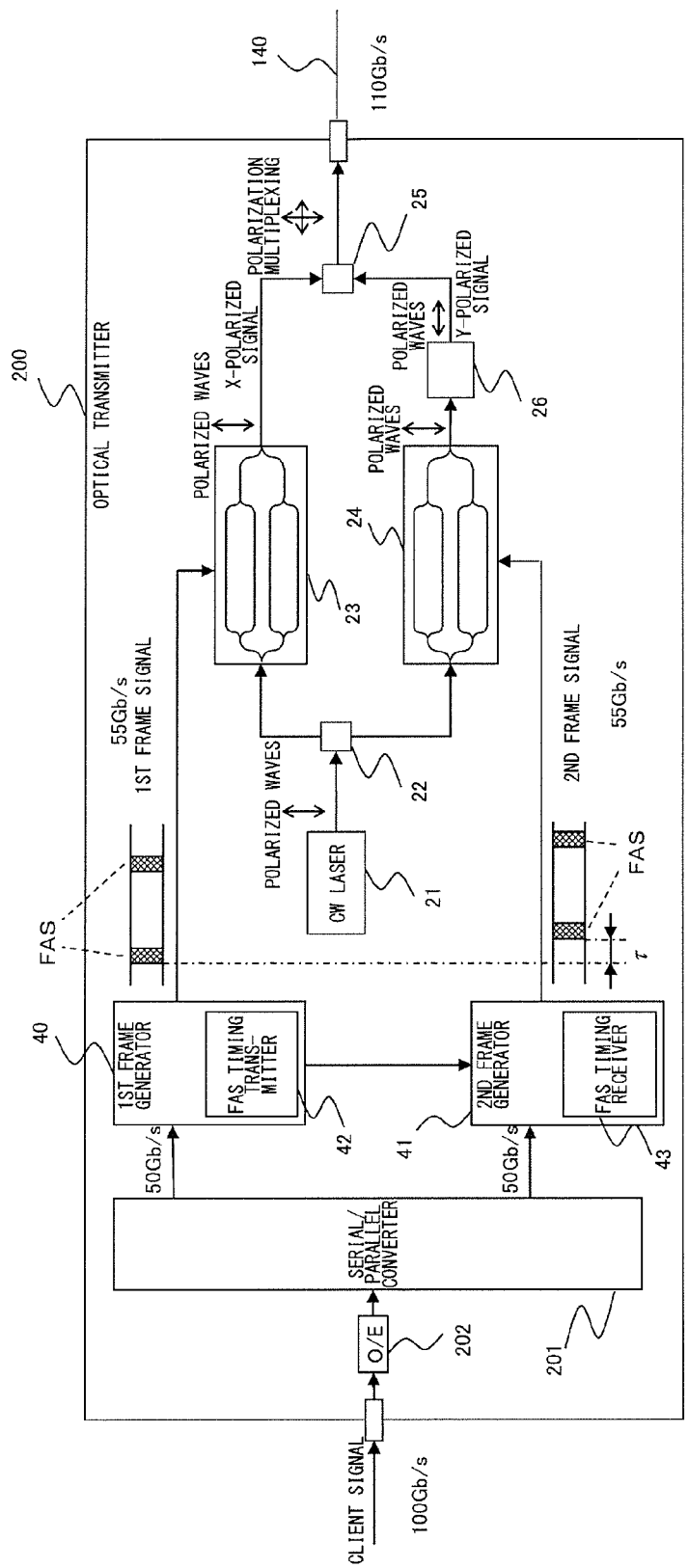
FIG. 20 illustrates an exemplary structure in an optical transmitter of a polarization multiplexing transponder apparatus.

FIG. 20 illustrates an exemplary structure of an optical transmitter in the polarization multiplexing transponder apparatus. In an optical transmitter 200 shown in FIG. 20, a client signal of 100 Gb/s is optical-to-electrical (O/E) converted by an O/E converter 202 and is then serial-to-parallel converted by a serial-to-parallel converter 201 into two signals of 50 Gb/s each. The two signals are each stored in a frame and then an error-correcting code is added thereto. As a result, a first frame signal and a second frame signal are obtained. The first frame signal and the second frame signal are each an electric signal of 55 Gb/s. At this time, the FAS in the second signal is delayed, by the delay time τ, relative to the FAS in the first signal. It is requisite that the delay time τ be larger than 0 and smaller than T/2 (where T is the frame period, which is 2.5 ms, for instance). Thus, it is assumed herein that a delay corresponding to 8 bits is selected as τ. Now, the first frame signal and the second frame signal are inputted to two-polarization QPSK modulators 23 and 24. The output from the QPSK modulator 24 passes through the ½ wavelength plate 26, so that the polarized wave is converted into a vertically-polarized wave. The X-polarized signal, which is a horizontally-polarized signal, and the Y-polarized signal, which is a vertically-polarized signal, are polarization-multiplexed by the polarization beam coupler 25 and then transmitted. The bit rate of the polarization-multiplexed optical signal outputted from the optical transmitter 200 is 110 Gb/s.

Figure 21:
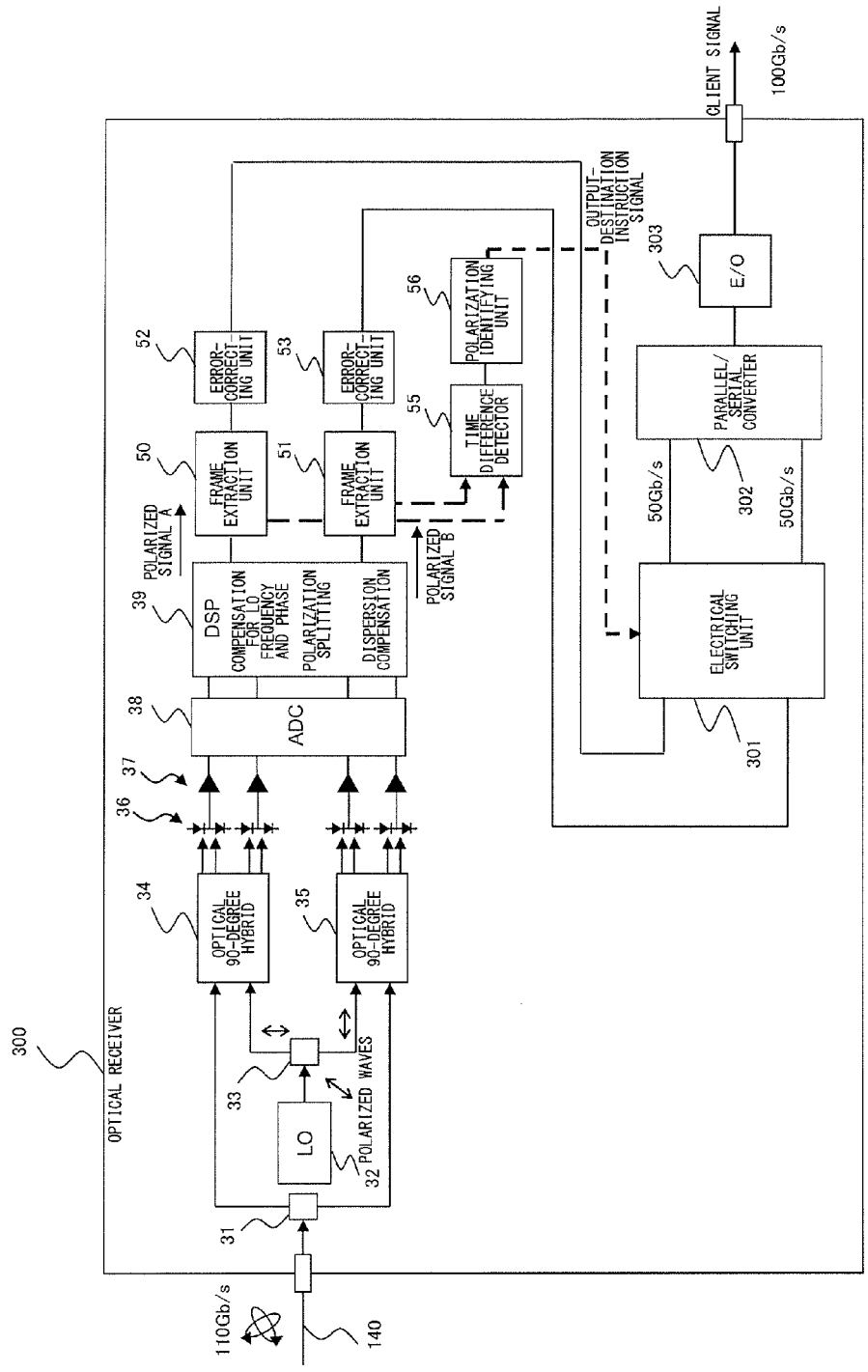
FIG. 21 illustrates an exemplary structure of an optical receiver in a polarization multiplexing transponder apparatus.

FIG. 21 illustrates an exemplary structure of an optical receiver in the polarization multiplexing transponder apparatus. The received polarization-multiplexed optical signal of 110 Gb/s is first split into a horizontally-polarized wave and a vertically-polarized wave by the polarization beam splitter 31. The local light outputted from the local oscillator 32 is inputted to the polarization beam splitter 33 with the polarization axis shifted by 45 degrees and are then separated into a horizontally-polarized wave and a vertically-polarized wave. The horizontally-polarized wave and the vertically-polarized wave are inputted to the optical 90-degree hybrid circuits 34 and 35, respectively, where the signal light and the local light are made to interfere with each other. The outputs of the optical 90-degree hybrid circuits 34 and 35 are optical-to-electrical (O/E) converted by four pairs of balanced photodiodes 36 and then digitized by the ADC 38. Through the DSP 39, the digitized signals are subjected to the processes including (1) compensation for frequency/phase shift, (2) polarization splitting, (3) wavelength dispersion compensation, and (4) polarization mode dispersion compensation. Two types of data outputted from DSP 39 undergo frame extraction and error correction and then any one of them is identified, as either the X-polarized signal or Y-polarized signal, by the time difference between the FASs. Based on the identification result, the switching direction of an electrical switching circuit 301 is determined. Finally, two signals of 50 Gb/s each are restored into a signal of 100 Gb/s by a parallel-to-serial converter 302 and then electrical-to-optical (E/O) converted by an E/O converter 303 so as to be outputted as a client signal of 100 Gb/s.

Figure 22:
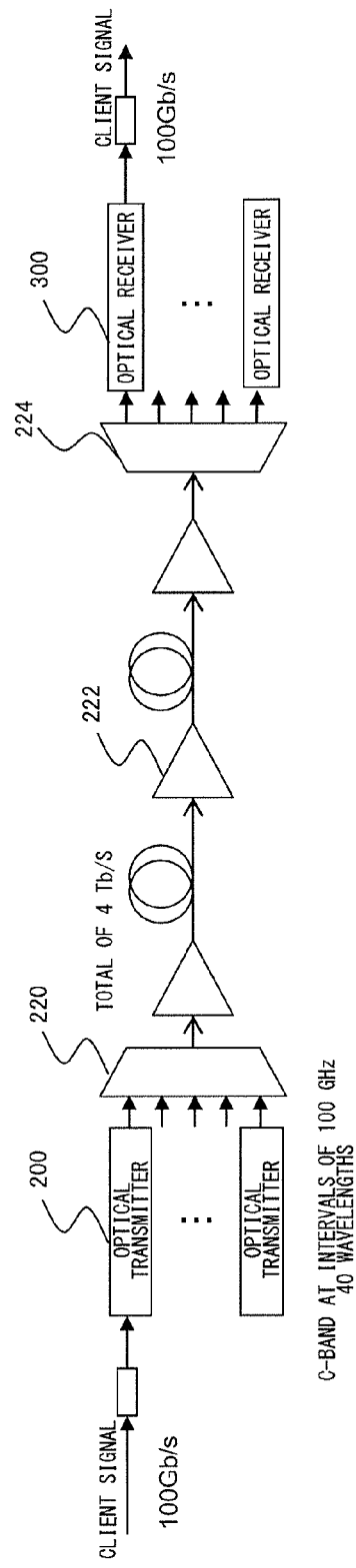
FIG. 22 illustrates an exemplary structure of a point-to-point WDM optical transmission system.

FIG. 22 illustrates an exemplary structure of a point-to-point wavelength division multiplexing (WDM) optical transmission system. In this WDM optical transmission system, a plurality of optical transmitters 200, each of which is the optical transmitter 200 as shown in FIG. 20, are placed side by side where the number of the plurality of optical transmitters 200 is equal to the total number of multiple wavelengths. In the WDM optical transmission system, the client signal is inputted to a WDM filter 220 where it is wavelength-multiplexed. The wavelength-multiplexed signals are subjected to multi-wavelength batch amplification in an erbium-doped fiber amplifier (EDFA) 222. As a result, the transmission loss is compensated and therefore the transmission distance can be extended. At the receiving station, the wavelength is separated by a WDM filter 224 and then each channel is inputted to the optical receiver 300 of FIG. 21. In the present exemplary embodiment, the bit rate is set to 4 Tb/s such that the signals of 100 Gb/s are arranged at intervals of 100 GHz for 40 C-band wavelengths.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

What is claimed is:

1. An optical transmission system comprising:
   an optical transmitter configured to transmit an optical signal, where an X-polarized signal and a Y-polarized signal each having a predetermined frame structure are polarization-multiplexed, to an optical transmission path; and
   an optical receiver configured to receive the optical signal that has propagated through the optical transmission path,
   the optical transmitter including:
      a delay generator configured to delay a frame start position of the Y-polarized signal, by a predetermined delay time, relative to that of the X-polarized signal, and
   the optical receiver including:
      a polarization splitter configured to split the received optical signal into two polarization signals which are orthogonal to each other;
      a time difference detector configured to detect a time difference of frame start positions between the two polarized signals; and
      a polarization identifying unit configured to identify which of the two polarized signals is the X-polarized signal or Y-polarized signal,
   wherein a frame period of the X-polarized signal is equal to that of the Y-polarized signal, and
   the delay time is less than a half of the frame period.

2. The optical transmission system according to claim 1, wherein the polarization identifying unit identifies the smaller time difference of two time differences detected by the time difference detector, and determines that a polarized signal whose frame start position is positioned anteriorly in terms of time is the X-polarized signal and determines that a polarized signal whose frame start position is positioned posteriorly in terms of time is the Y-polarized signal.

3. The optical transmission system according to claim 1, wherein the polarization splitter performs orthogonal polarization splitting using a polarization diversity mechanism and a digital coherent receiving mechanism.

4. The optical transmission system according to claim 1, wherein the polarization splitter performs orthogonal polarization splitting using a polarization controller.

5. An optical transmission system comprising:
   an optical transmitter configured to transmit an optical signal, where an X-polarized signal and a Y-polarized signal each having a predetermined frame structure are polarization-multiplexed, to an optical transmission path;
   an optical receiver configured to receive the optical signal that has propagated through the optical transmission path,
   the optical transmitter including:
      a delay generator configured to delay a frame start position of the Y-polarized signal, by a predetermined delay time, relative to that of the X-polarized signal, and
   the optical receiver including:
      a polarization splitter configured to split the received optical signal into two polarization signals which are orthogonal to each other;
      a time difference detector configured to detect a time difference of frame start positions between the two polarized signals; and
      a polarization identifying unit configured to identify which of the two polarized signals is the X-polarized signal or Y-polarized signal; and,
   an output switching unit configured to switch output destinations of the two polarized signals, based on an identification result of the polarization identifying unit.

6. The optical transmission system according to claim 5, wherein the output switching unit switches the output destinations of the two polarized signals by an electrical switching circuit.

7. The optical transmission system according to claim 5, wherein the output switching unit switches the output destinations of the two polarized signals by a crossbar optical switch.

8. An optical transmission system comprising:
   an optical transmitter configured to transmit an optical signal, where an X-polarized signal and a Y-polarized signal each having a predetermined frame structure are polarization-multiplexed, to an optical transmission path;

an optical receiver configured to receive the optical signal that has propagated through the optical transmission path, the optical transmitter including:
  a delay generator configured to delay a frame start position of the Y-polarized signal, by a predetermined delay time, relative to that of the X-polarized signal, and the optical receiver including:
  a polarization splitter configured to split the received optical signal into two polarization signals which are orthogonal to each other;
  a time difference detector configured to detect a time difference of frame start positions between the two polarized signals; and
  a polarization identifying unit configured to identify which of the two polarized signals is the X-polarized signal or Y-polarized signal;

wherein in the event that input of signals is interrupted, the optical transmitter continues to transmit the X-polarized signal and/or the Y-polarized signal in which scrambled signal(s) are/is frame-structured, and the delay generator continues to delay the frame start position of the Y-polarized signal, by the predetermined delay time, relative to that of the X-polarized signal.

\* \* \* \* \*